United States Patent [19]

Hamilton

[11] 3,895,931
[45] July 22, 1975

[54] CONTINUOUS MOTION GLASS MOLDING MACHINE WITH GOB DELIVERY MEANS

[75] Inventor: Joseph R. Hamilton, Anderson, Ind.

[73] Assignee: Lynch Corporation, Anderson, Ind.

[22] Filed: Oct. 5, 1972

[21] Appl. No.: 295,164

[52] U.S. Cl. ................................. 65/207; 65/304
[51] Int. Cl. ......................................... C03b 5/30
[58] Field of Search ................... 65/207, 304, 260

[56] References Cited
UNITED STATES PATENTS

| | | | |
|---|---|---|---|
| 1,331,511 | 2/1920 | LaFrance | 65/207 |
| 1,975,051 | 9/1934 | Peiler | 65/260 |
| 2,011,187 | 8/1935 | Rowe | 65/260 X |
| 2,634,552 | 4/1953 | Woolling | 65/260 |
| 2,811,815 | 11/1957 | Eldred | 65/304 X |
| 2,958,159 | 11/1960 | Denman | 65/304 X |
| 3,303,013 | 2/1967 | Mumford et al. | 65/260 |
| 3,650,725 | 3/1972 | Okumura et al. | 65/260 X |

Primary Examiner—S. Leon Bashore
Assistant Examiner—Frank W. Miga
Attorney, Agent, or Firm—Molinare, Allegretti, Newitt & Witcoff

[57] ABSTRACT

A continuous motion glass molding machine. A plurality of upwardly opening glass molds of a selected size and shape are carried on a horizontal base. A delivery mechanism is provided for delivering a glass gob into each of the molds. The delivery mechanism has an outer delivery end which is aligned directly above the mold path. A mechanism is provided for oscillating the delivery mechanism about a first upright axis for the movement through a selected angle while, at the same time, moving the delivery end through a selected arc of travel. A drive mechanism is provided for continuously moving the molds through a selected closed path of travel for movement about the upright axis of the main part of the machine, the first upright axis being positioned exterior of the area defined by the closed path of travel of the molds. A cam mechanism is provided for guiding the molds in the closed path of travel and into a selected arcuate path of travel which is aligned directly below the arc defined by the moving delivery end of the delivery mechanism. A control system is provided for delivering a glass gob to each of the molds only when the molds are moving in the arcuate path of travel and only when the mold positions are positioned substantially directly below the delivery end of the delivery mechanism. Vertically reciprocable rams move in and out of engagement with the molds in order to form the glass products or ware of the desired size and shape. A take-out mechanism removes the formed glass products from the molds.

20 Claims, 33 Drawing Figures

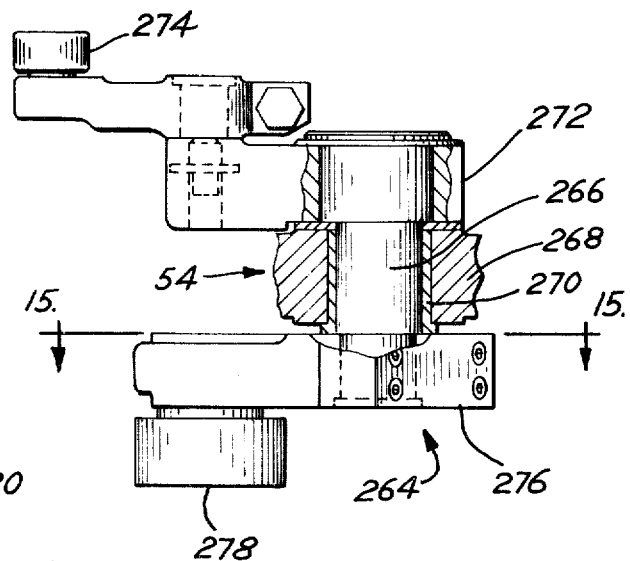
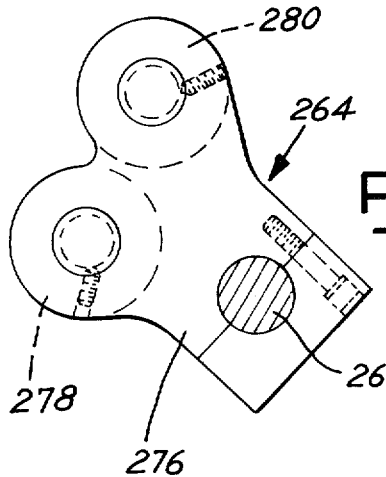
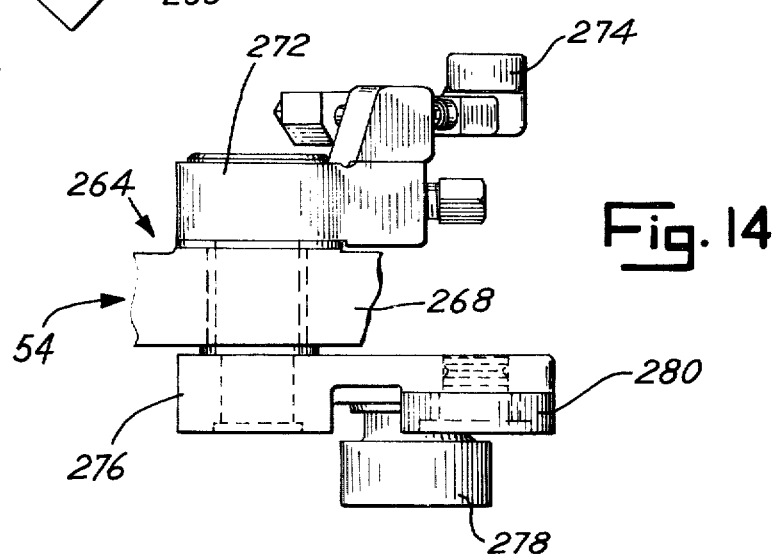

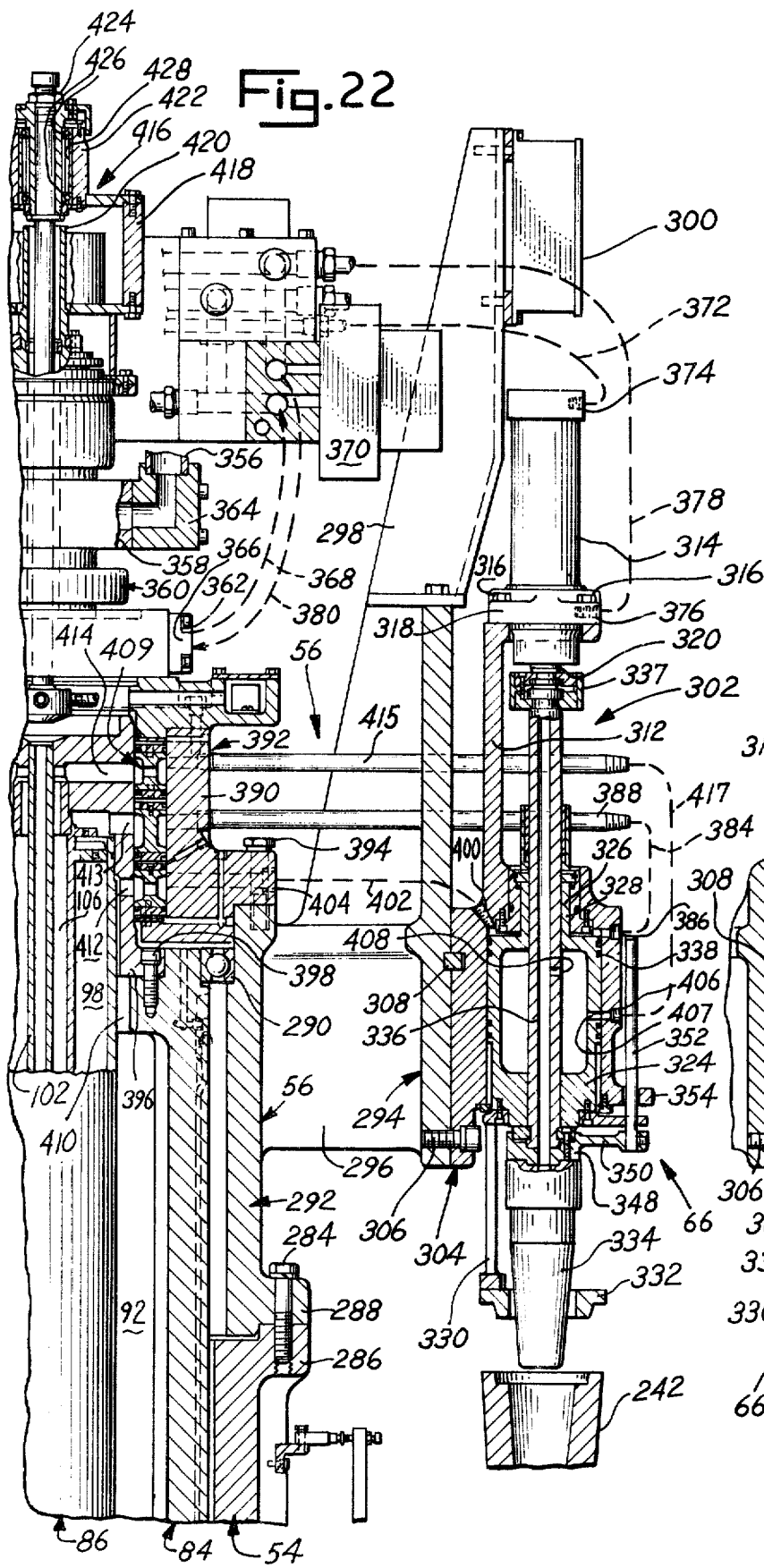
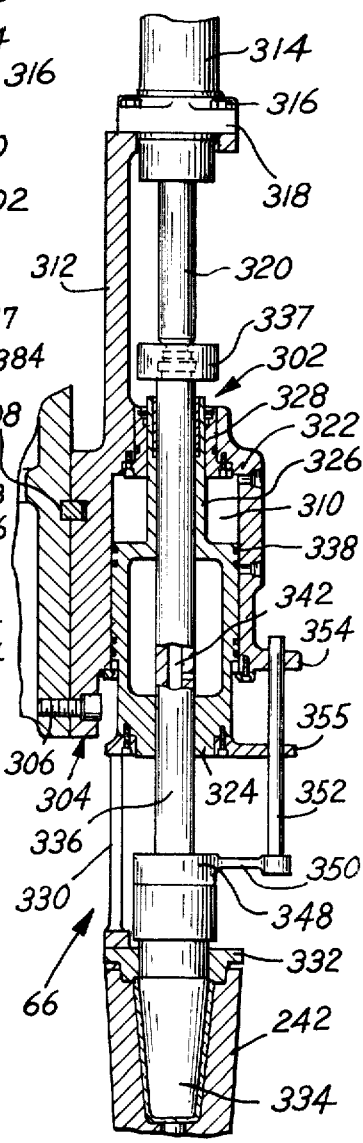
Fig. 22
Fig. 23

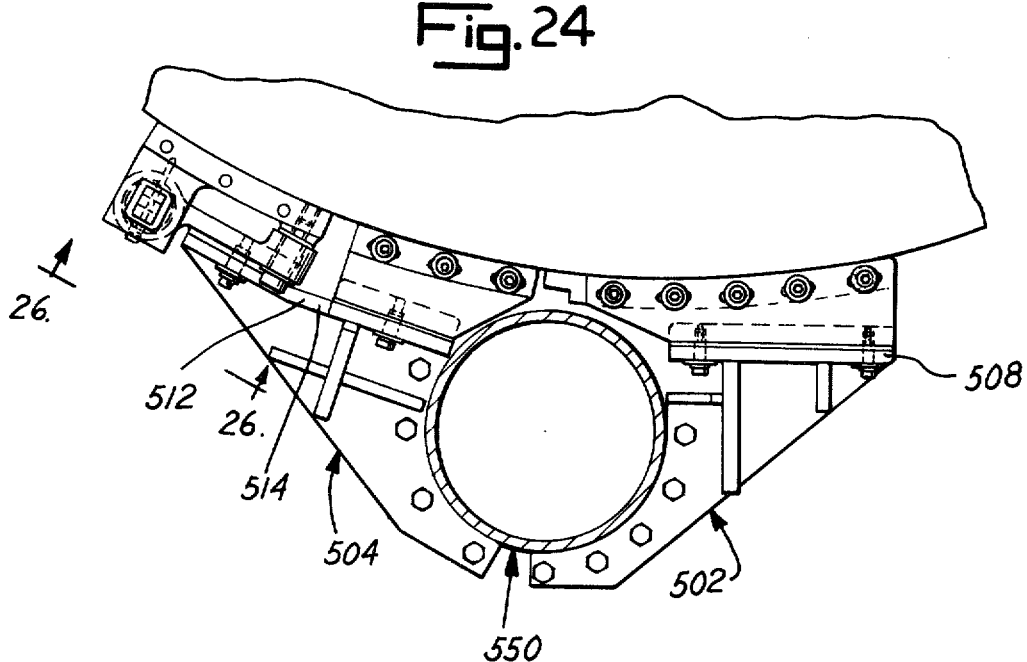
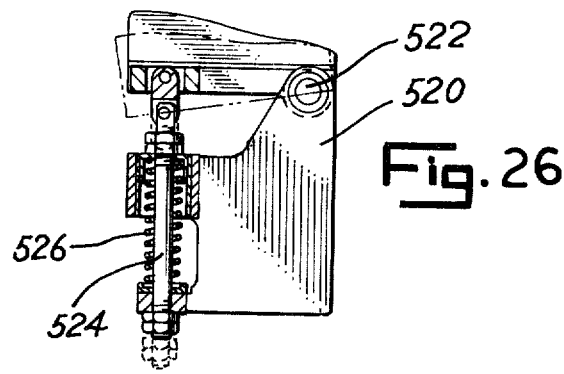
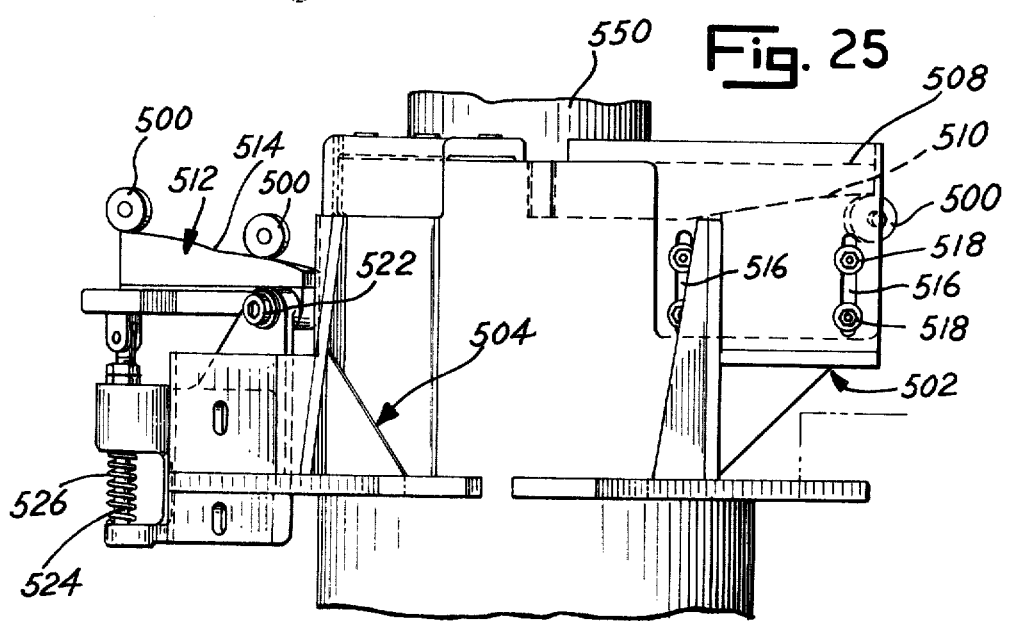

CONTINUOUS MOTION GLASS MOLDING MACHINE WITH GOB DELIVERY MEANS

BACKGROUND OF THE INVENTION

FIELD OF THE INVENTION AND DESCRIPTION OF THE PRIOR ART

This invention relates to glass molding machines and it particularly relates to glass molding machines wherein the molding operation is continuous.

Glass molding machines are generally of two types. Probably the most common and widely used type of glass molding press for making glass articles such as tumblers, or like glass articles, has been an indexing or intermittently operating type of machine. In such machines, the mold basket is carried to a position below the delivery area and is stopped momentarily as a glass gob is dropped into the mold by the delivery mechanism. Following delivery, the machine indexes and a ram is brought down into the mold to form the glass product. The machine again continues the indexing or intermittent operation until the forming and cooling of the product or ware is completed.

The second general type of glass making machine, used to a far lesser extent than the indexing type, is continuous motion machines for forming glass articles wherein the molds are in continuous movement as the glass is delivered to the molds as they are moving. The forming is completed as the molds are moving and the ware or products are cooled and set.

Generally speaking, a continuous motion press, as opposed to an indexing or intermittent operation, is preferred for several reasons. First, as would be expected in the case of any continuous operating production machine, the machine operation is relatively faster and the production rate is relatively higher than in an indexing or intermittent operating machine. Furthermore, it is possible, with the continuous motion press, to have more time available to form the ware during the forming and cooling so that an improved product results. Furthermore, the operation of the machine is smoother and is easier on the equipment because the normally rather massive equipment is not constantly undergoing changes in inertia, that is, constantly starting and stopping, as is true in an indexing type of machine.

Although a continuous motion press would generally be considered as preferable over an indexing or intermittent glass molding machine, because of the higher production rate, smoother operation, and improved product, the continuous motion glass making machines which have been used in the past have not generally proven to be completely satisfactory for a variety of reasons, resulting in the greater use of the indexing type of machine. One of the principal reasons for such lack of general use of the continuous motion machines has been the problem encountered in delivering the glass gobs to the moving molds. In the glass molding machines that have been used in the past, the molds into which the gobs are dropped or placed are generally moved through a horizontal path of travel. In the known machines, the molds have been fixed to a rotating table. In any glass making machinery, probably the most critical part of the operation is the placement of the glass gobs into the molds and this is the area where the known continuous motion presses have not proven to be entirely satisfactory.

In order to deliver the glass gob into the molds at the proper time, during machine set up, the operator must adjust the equipment so that the gob is dropped into the mold at the proper position in the mold at the proper time. In the known equipment, the molds in the delivery are moved in a fixed arcuate path of travel and it was necessary to adjust the position of the delivery end of the deflector. Because the deflector and the entire delivery mechanism are normally placed outside of the plane or area defined by the path of travel of the molds, the time at which the glass gobs could be dropped, in the prior art machine, was very limited. First, if the deflector is adjusted so that the delivery end of the deflector is positioned directly above the center of the arcuate path of travel of the molds there would be only one time or two times during which the path of the delivery end and the path coincide so the mold could be in position to receive the glass gob. In practice, it has been found to be extremely difficult to properly set up the known continuous motion equipment in such a way that the glass gob is consistently dropped into place in each of the successive molds during the continuous operation of the equipment. Not only has this caused difficulty in setup, but the adjustment mechanism required for the delivery equipment is considered to be rather complex and expensive to construct, operate and maintain.

In addition to the foregoing disadvantages of known continuous motion machines, other drawbacks have been found in ram operation and construction and in properly cooling the molds to properly set the ware before the ware must be removed from the molds.

SUMMARY OF THE INVENTION

It is therefore an important object of this invention to provide a continuous motion glass molding machine wherein the disadvantages and drawbacks of prior art machines are substantially avoided.

It is also an object of this invention to provide an improved continuous glass molding machine wherein the delivery of the glass gobs into the continuously moving mold means is quite simple and yet the adjustability of the timing of the dropping of the gobs into the molds is adjustable over a rather wide range.

It is a further object of this invention to provide a continuous moving glass molding machine wherein the molds are moved in a closed path of travel and are guided by cam means through the continuous path of travel.

It is yet another object of this invention to provide an improved continuously moving glass molding machine wherein the delivery mechanism is moved through an arc and the mold means are moved into an arcuate path of travel in alignment below or coincident with the arc defined by the end of the deflector.

It is yet another object of this invention to provide an improved continuously moving glass molding machine wherein the mold means are guided by cam means through a closed path of travel including at the delivery position and at the take out position so that the delivery mechanism can be easily and simply adjusted to drop the glass gobs into each of successive series of continuously moving molds at the proper moment and to continually receive or take out the formed ware at the proper time.

It is still a further object of this invention to provide an improved continuously moving glass molding machine wherein the equipment is particularly characterized by its high production rate, smoothness of operation and high quality products formed thereon.

It is yet a further object of this invention to provide a continuous motion glass molding machine wherein a separate continuously moving ram is provided for each of the moving molds so that the ware may be properly confined and cooled to provide a particularly well-formed glass article substantially without significant defects therein.

It is also a further object of this invention to provide a continuous motion glass molding machine wherein the cooling means is particularly effective by passing upwardly through the fixed table and to the mold basket, the cooling wind being under full control at all times.

Further purposes and objects of this invention will appear as the specification proceeds.

Many of the foregoing objects are accomplished by my glass making machine which includes upwardly opening molds, a delivery mechanism for delivering a glass gob into the molds, the delivery mechanism having a delivery end at a level which is aligned above the mold, a mechanism for pivoting the delivery mechanism about a first upright axis and through a selected angle while at the same time moving the delivery end through a selected arc, means for continuously moving the molds through a selected and closed path of travel in a horizontal plane and about the upright axis of the machine, cam guides for moving the mold means into a reverse arcuate path of travel, the arcuate path of travel of the molds being in alignment below the selected arc of the delivery end of the delivery mechanism, a control arrangement for deliverying the glass gob to the mold only when the mold is moving in the arcuate path and is positioned directly below the delivery end, separate rams for moving into each of the molds to form the glass articles following dropping of the gob, and means for removing the glass articles from the molds after the rams have been moved out of the molds and after the articles have been completely formed, cooled and set in the molds. Preferably, the machine has cooling wind means provided in the fixed base of the machine, in a moving table carrying the molds, and in the molds themselves.

BRIEF DESCRIPTION OF THE DRAWINGS

One particular embodiment of the present invention is illustrated in the accompanying drawings wherein:

FIG. 13 is a side elevational view, viewed along the line 13—13 of FIG. 12, of the crank assembly illustrated in FIG. 12;

FIG. 14 is a partially broken view of the crank assembly and taken along the line 14—14 of FIG. 12;

FIG. 15 is a sectional view taken along the line 15—15 of FIG. 13;

FIG. 22 is a side elevational view, partially in section, of the upper table and a ram prior to insertion into a mold;

FIG. 23 A is a broken sectional view showing the inside of a ram head;

FIG. 24 is a plan view of the mounting structure for cams used to operate the kick up mechanism;

FIG. 25 is a side elevational view of the kick up assembly shown in FIG. 24;

FIG. 26 is a detailed side elevational view viewed along the line 26—26 of FIG. 24;

DETAILED DESCRIPTION OF THE PREFERRED EMBODIMENT

GENERAL DESCRIPTION

Figure 1:
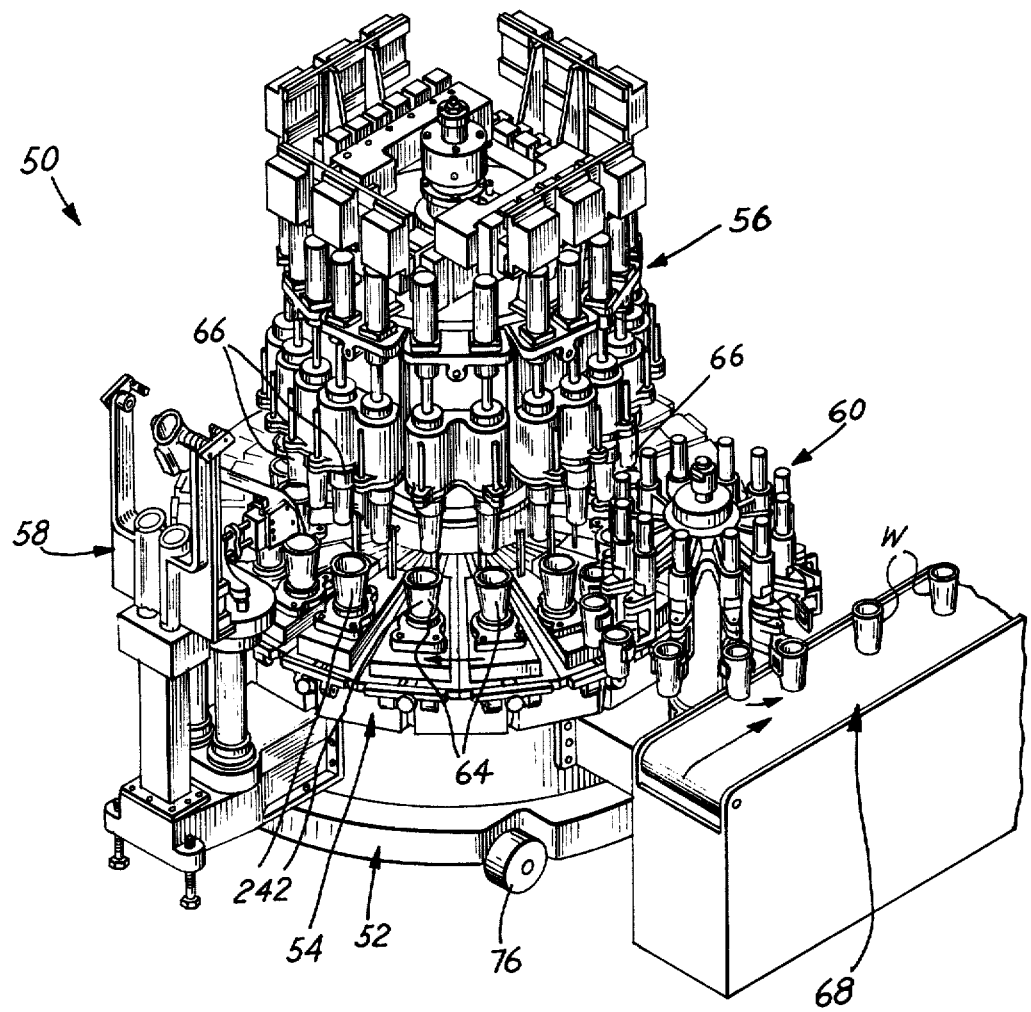
FIG. 1 is an overall pictorial view of my new continuous motion glass making machine.

Referring to FIG. 1, my glass molding machine, generally 50, is shown in pictorial view. Generally speaking, the machine 50 includes a base, generally 52, a rotary lower table, generally 54, a rotary upper table, generally 56, a glass delivery mechanism, generally 58, and a glass product or ware take-out mechanism, generally 60.

Figure 2:
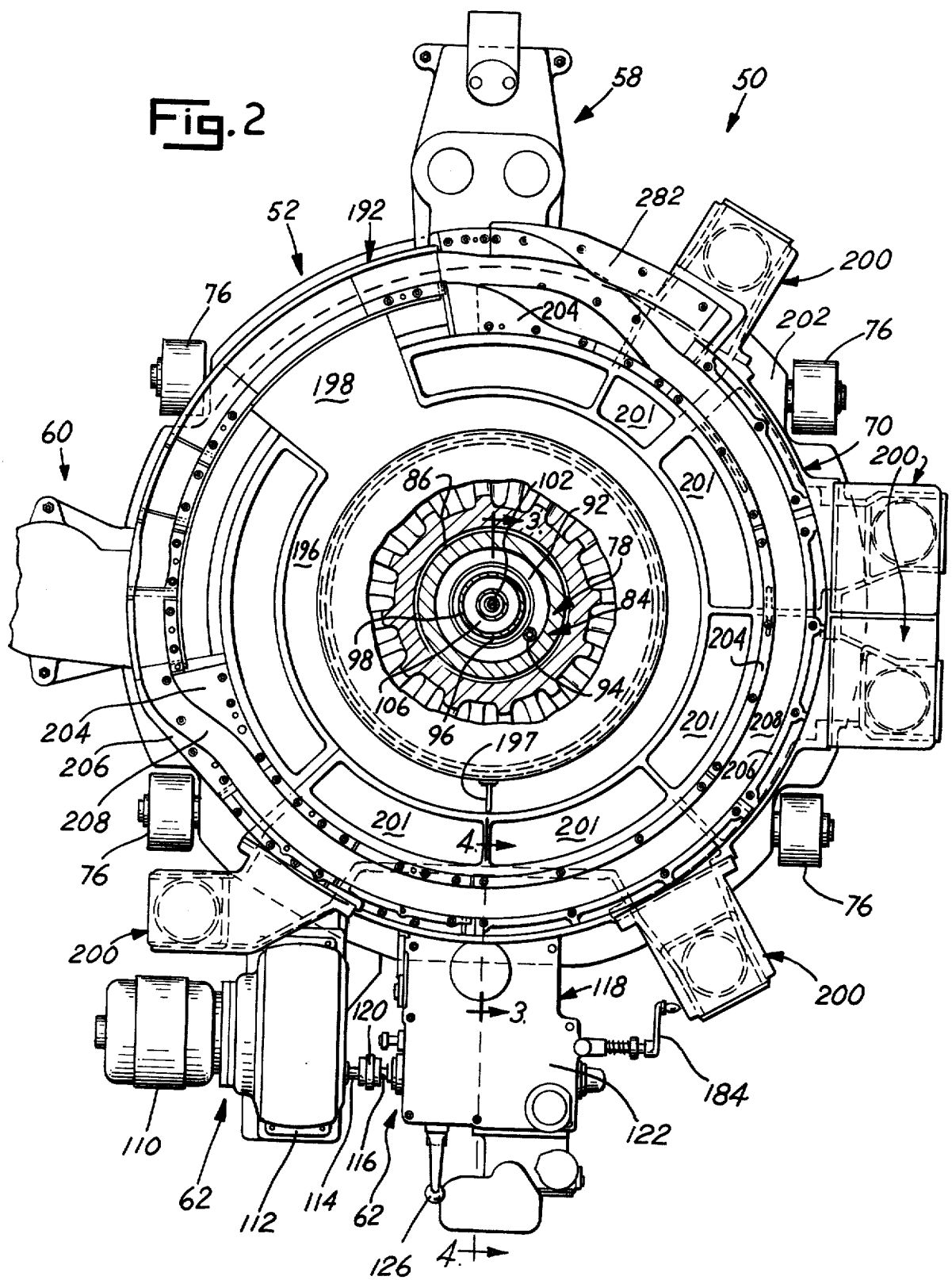
FIG. 2 is a top plan view, partially broken, of the base portion of the glass making machine shown in FIG. 1, showing the portions of the drive mechanism, the delivery mechanism, and the take-out assembly.

Referring to FIG. 2, a drive system, generally 62, is shown in plan view relative to the remaining portions of the machine 50. The drive mechanism 62 is operative to drive the lower table 54 and upper table 56 about an upright axis. The delivery mechanism 58 delivers a glass gob or glass gobs of a selected charge size successively to each of a plurality of molds, generally 64, which are continuously moved in a closed path of travel on the lower table 54. After the glass gob has been received within a mold 64, a ram assembly, generally 66, provided for each of the molds 64, is lowered by hydraulic pressure into the mold so that the glass gob forms into the desired shape between the head of the ram assembly 66 and the cavity of the mold assembly 64. The lower table 54 and upper table 56 carry the molds 64 and ram 66 respectively, at the same rotary speed for cooling and setting of the glass product. The rams 66 are moved upwardly out of the molds 64, after the ware is formed, prior to the take-out mechanism 66. The formed glass product or ware W is moved upwardly out of the mold 64 a sufficient distance to be picked up by the take-out mechanism 60 and carried to the belt conveyor 68 located adjacent the take-out mechanism 60. A detailed description of the portions of the machine 50 will be hereinafter provided.

FIXED BASE AND CENTER COLUMN

Figure 3:
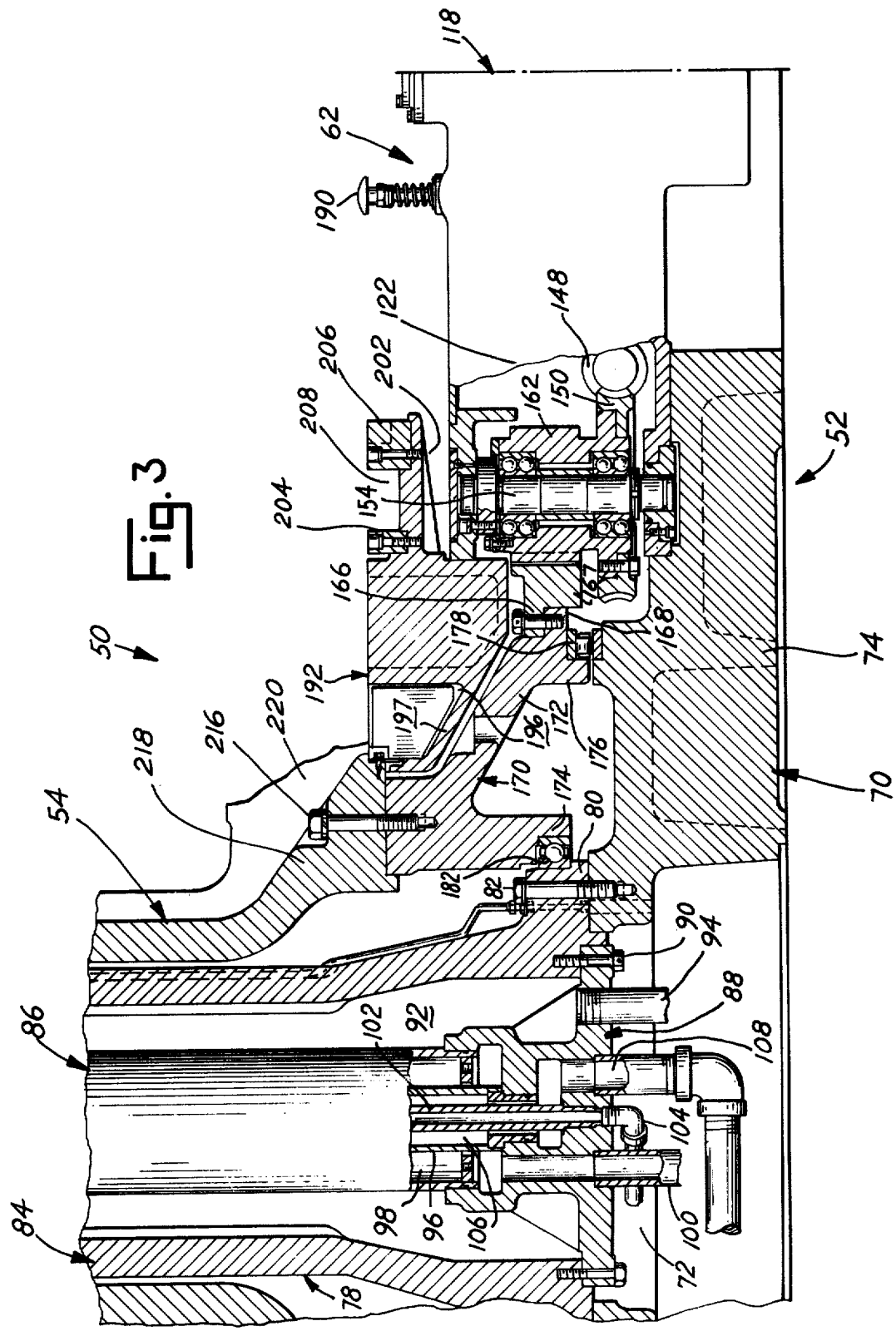
FIG. 3 is an enlarged, upright, partially broken sectional view taken along the line 3—3 of FIG. 2, showing a typical section through the base of the machine of FIG. 1.

Referring to FIGS. 2 and 3, the base or foundation 52 of the glass making machine 50 includes a cast iron base 70, having an open central portion 72 which is surrounded by an annular portion 74. As best shown in FIGS. 1 and 2, the base casting 70 is constructed to receive casters or rollers 76 for convenient movement of the entire machine 50. Once the machine has been installed the casters 76 may be removed from the equipment, if desired. The base casting 70 primarily functions as a foundation for the machine 50 and as a locator for other major parts of the machine, including primarily the central column 78, the lower table 54, and the upper table 56. Furthermore, the cavities in the base 70 serve as a reservoir for lubricating oil between the fixed base and the rotating tables 54 and 56.

Referring to FIG. 3, the fixed upright center column assembly, generally 78, is mounted above the open center 72 of the base casting 70 and projects upwardly therefrom. The upright column 78 includes an annular flange 80 at its lower portion. Bolts 82 are provided to rigidly secure the upright center column 78 to the base casting 70 so the axes of the base 70 and column 78 coincide.

The center column 78 includes an outer cylindrical member 84 and an inner cylindrical member 86. The outer cylindrical member 84 is rigidly interconnected to the inner cylindrical member 86 by a bottom coupling flange 88. The outer periphery of the coupling flange 88 overlaps the inner periphery of the outer cylindrical member 84 at the bottom thereof, and bolts 90 rigidly interconnect the members 84 and 86 together. One of the principal functions of the outer cylindrical member 84 is as a support and alignment support for the upper and lower tables 56 and 54. In contrast to the inner cylindrical member 86, the outer cylindrical member 84 also functions as a load carrying member and the inner cylindrical member 86 provides a conduit for pressurized air used in operating the ram assemblies 66 of the machine 50.

An annular space 92 is defined between the outer cylindrical member 84 and the inner cylindrical member 86. A conduit 94 is interconnected to the annular space 92 through the coupling flange 88. The main air supply, at a pressure of about 40 psi, passes through the conduit 94 and into the pressurized air space 92. As will be described hereinafter, this main air supply is used in the operation of the ram assemblies 66.

A central tube 96 is positioned concentrically inwardly of the inner cylindrical member 86 to thereby define an annular chamber 98 between the central tube 96 and the inner cylindrical member 86. A conduit 100 is connected to the annular space 98. The conduit is also connected to a pressurized air source (not shown) to provide air pressure of about 90 psi in the annular chamber 98. This air pressure is used as "air spring" pressure during the operation of the ram assemblies 66.

A central drain tube 102 is positioned concentrically interior of the central tube 96. The machine 50 is constructed so that any oil that leaks from the rams 66 during the operation thereof is collected in the drain line 102 and is carried back to an oil supply tank (not shown) through an outlet conduit 104 at the bottom of the drain line 102. Another annular chamber 106 is defined between the drain tube 102 and the central tube 96. An air line 108 communicates with the annular chamber 106 to supply cooling air to the plungers of the ram assemblies 66, which assemblies 66 will be hereinafter described in greater detail.

As will become apparent, the fixed base casting 70 and the fixed center upright column 78 rotatably support and align the upper table 56 and the lower table 54; the casting 70 and the upright column 78 thus, effectively rotatably carrying and centering all of the rotating parts of the machine 50.

DRIVE ASSEMBLY

Referring to FIGS. 2 – 5, the main drive assembly 62 is shown in detail. FIG. 2 shows in plan view, a drive motor, 110, which is operatively interconnected to a gear reducing set 112. The output shaft 114 of the gear reducing set 112 is rigidly interconnected to the drive shaft 116 of a gear box assembly 118 by means of a shaft coupling 120. The gear box 118 comprises a housing 122 containing gears in an oil bath. The drive shaft 116 of the gear box 118 is interconnected to a clutch 124, in the gear box. The clutch 124 is manually engaged or disengaged by rotation of a lever 126 about a shaft 128 which is rotatably carried by the gear box 118. A drive pinion 130 is rotated upon engagement of the clutch 124. The pinion 130 engages an idler gear 132 on a shaft 134 which is supported in side walls defining the gear box 118. The idler gear 132, in turn, rotates an idler gear 136, carried on a shaft 138 mounted in the side walls of the gear box 118.

Figure 4:
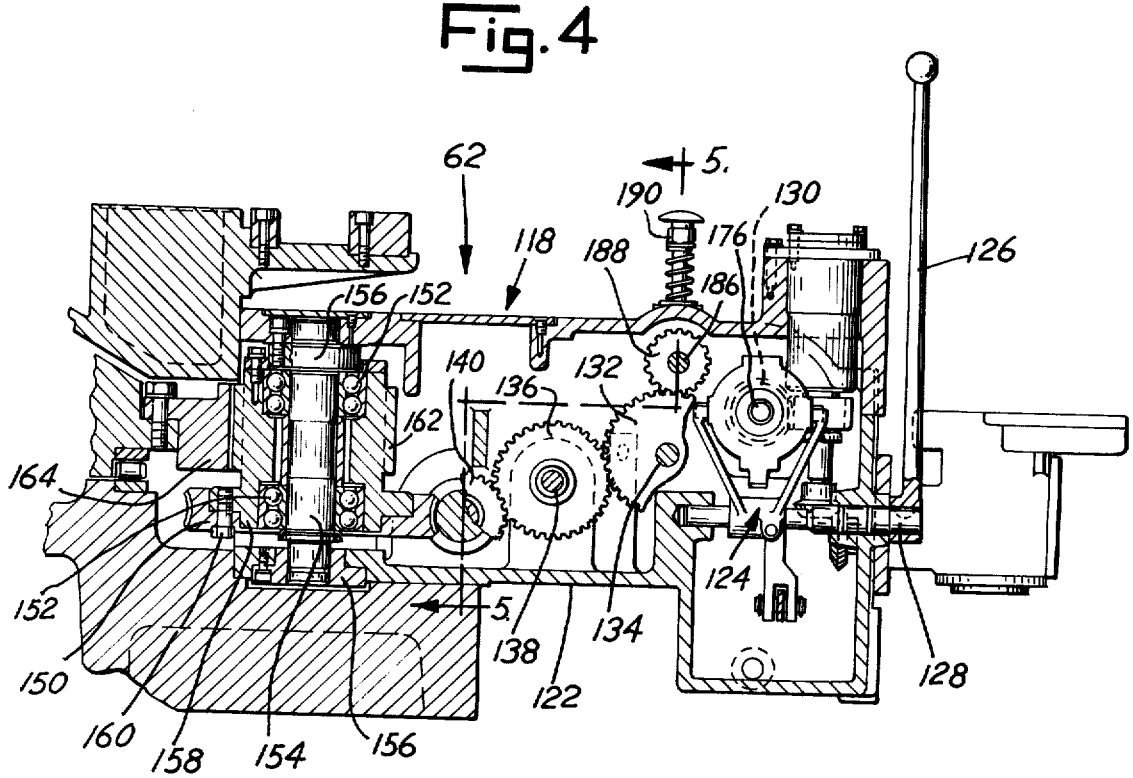
FIG. 4 is an enlarged sectional view taken along the line 4—4 of FIG. 2 showing the gear box of the drive mechanism for the machine of FIG. 1.
Figure 5:
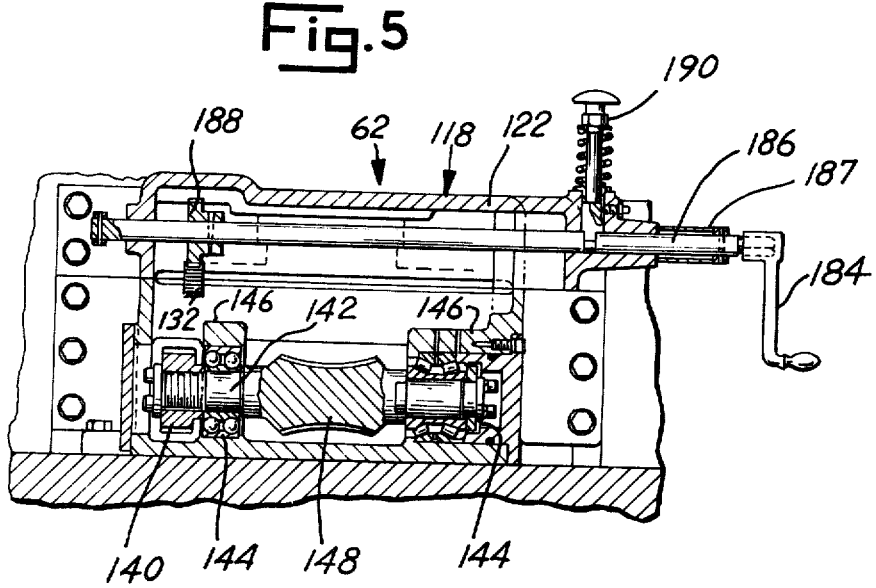
FIG. 5 is another sectional view of the gear box taken along the line 5—5 of FIG. 4.
Figure 6:
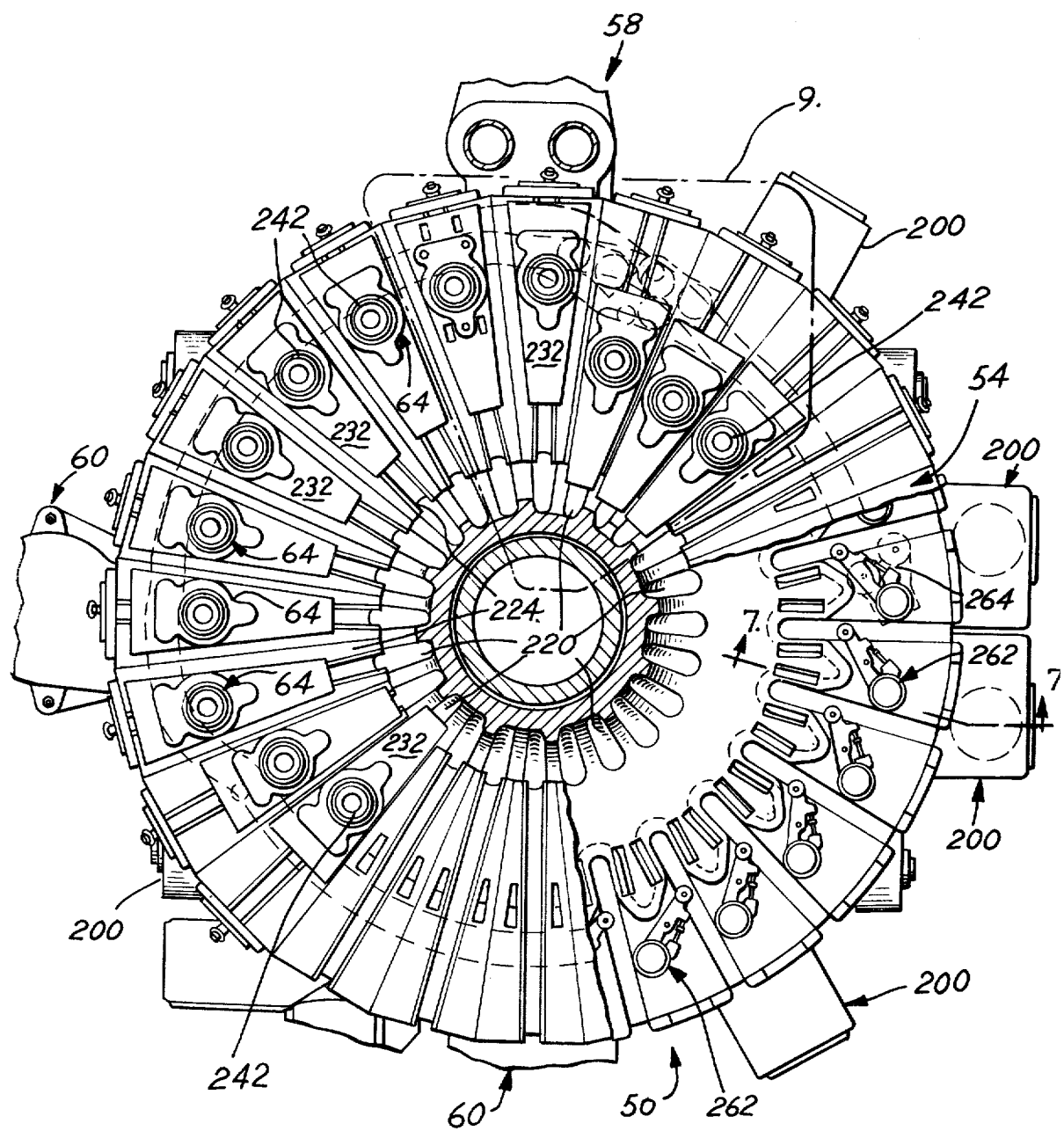
FIG. 6 is a top plan, partially broken view, similar to FIG. 2, but showing the molds and mold carrying carriages in place on the machine.

Referring to FIGS. 4 and 5, in particular, the gear 136 engages a pinion 140, which is mounted on a horizontal shaft 142. The shaft 142 is rotatably mounted in bearings 144 received in end supports 146. Referring to FIGS. 3, 4, and 5, a worm, 148, is rigidly mounted on the rotary shaft 142. As best seen in FIGS. 3 and 4, the rotary worm 148, meshes with a worm wheel 150 which is thereby rotated about a vertical axis. The worm wheel 150 is rotatably carried by a pair of upper and lower bearings 152 mounted on an upright shaft 154. The shaft 154 is rigidly secured to the upper and lower supports156 in the gear box housing 122. The worm wheel 150 is rigidly mounted on a hub 158 by bolts 160, the hub 158 being rotatable as a unit with the worm wheel 150. The upper portion of the hub 158 has a unitary drive pinion 162 provided thereon. The drive pinion 162 drivably meshes with a ring gear 164. The ring gear 164 is an annular member with its diameter located intermediate the outer and inner peripheries of the annular portion 74 of the fixed base casting 70. As will be hereinafter described, the rotation of the ring gear 164 rotates both the upper table 56 and the lower table 54 about the upright central axis of the machine 50.

The ring gear 164, has inner peripheral flange 166, which overlaps an outer peripheral flange 168 on a ring gear hub 170. The ring gear hub 170 comprises a large annular casting having an upwardly and inwardly tapered wall 172 and an inner peripheral upright wall 174. The outer periphery of the ring gear hub 170 also includes an outer upright wall 176 spaced from the inner wall 174. A thrust bearing 178 is interposed between the lower surface of the upright outer wall 176 and a central annular ridge 180 located centrally of the annular portion 74 of the base casting 70. The thrust bearing 178 rotatably carries and supports all of the rotating mechanism, including the lower table 54 and upper table 56. A radial guide bearing 182 is interposed between the lower portion of the inner upright wall 174 of the ring gear hub 170 and an upright face of the outer flange 80 of the upright column 78. The radial guide bearing 182 radially locates or centers the ring gear hub 170 relative to the upright central axis of the machine 50.

A crank arm 184 is rigidly interconnected to a split or splined shaft 186 located in the upper portion of the gear box housing 122. The shaft is rotatably supported in the housing 122 and a gear 188 is non-rotatably mounted on the shaft 186. The gear meshes with the gear 132 which is in the normal gear drive of the gear box 118 for operating the ring gear 164. In the position shown in FIG. 5, the outer end portion of the shaft 186 is disengaged from the inner portion thereof. In the disengaged position, a spring 189 normally urges the outer shaft portion outwardly to the disengaged position. When the outer shaft portion is pushed inwardly, the entire shaft 186 is engaged and operates or rotates as a unit. A spring biased latch 190, when pushed inwardly towards the shaft 186, locks the two engaged portions of the shaft 186 together for unified rotation by the crank 184. Such rotation rotates the gear 188 whereby the gear drive and ring gear 164 may be manually moved by an operator, as during the time of machine set-up.

CAM ASSEMBLY

Figure 7:
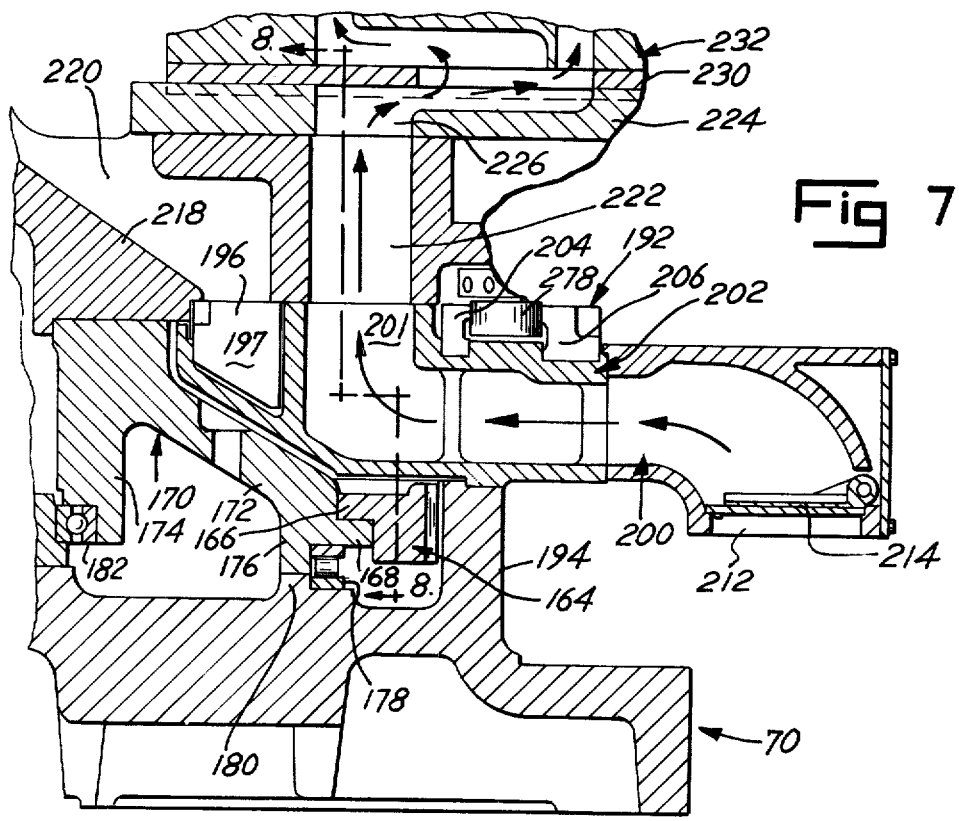
FIG. 7 is an enlarged sectional view taken along the line 7—7 of FIG. 6, showing the path provided in the machine for the cooling wind.

Referring to FIGS. 3 and 7, a cam support assembly, generally 192, is fixedly secured to and supported by the base casting 70. The base casting 70 includes an upright annular wall 194 which defines an outer housing wall or lateral cover for the ring gear 164. The wall 194 is continuous except for necessary drive connections between the ring gear 164 and the drive mechanism 62, the delivery mechanism 58, and the take-out mechanism 60. The cam support assembly, fixed to the casting 70 by suitable bolts or the like, is spaced from the running lower and upper tables 54 and 56. The cam support assembly serves several functions, including cam support, cullet disposal, and cooling wind inlet.

Referring to FIGS. 2, 3, and 7, the cam support assembly includes an inner annular channel 196 having upright side walls and a downwardly and outwardly tapered bottom wall. An upright cullet paddle 197 is fixed to the outer periphery of the upper table 56 and is received in the channel 196 in close proximity to the walls thereof. The paddle (or paddles) 197 moves with the table 56 to carry the cullet or waste glass in the channel 196 to the cullet discharge chute 198 which extends radially outwardly from the channel 196 for discharge of cullet to a collection area exterior of the machine 50. The cullet chute 198 is positioned intermediate the take-out mechanism 60 and the delivery mechanism 58.

The cam support assembly 192 also provides a plurality of cooling wind inlets 200 for bringing cooling air or wind to the molds so the glass articles or ware W will be sufficiently cooled and set during movement from the delivery position to the take-out position. As seen in FIG. 7, the wind channels extend inwardly and laterally through the assembly 192. As seen in FIG. 2, no cooling wind inlets are located between the take-out and delivery positions. The first wind inlet 200 is located just downstream of the delivery 58, the last wind inlet is located just upstream of the take-out 60, and three intermediate wind inlets are located therebetween. A wind control plate 214 is hingedly mounted in a horizontal position, in a closed condition, at the downwardly facing opening 212 of the wind inlet 200. The opening 212 is interconnected to an air supply source (not shown). The plurality of wind inlets 200 and control plates 214 advantageously provide close control over the quantity of cooling air that can be supplied to the molds during cooling thereof. As seen best in FIGS. 2 and 7, a plurality of separate arcuate segments 201 interconnect to each of the wind inlets 200 so that the amount of cooling air to each segment is readily controlled.

Referring to FIG. 3, an upper outer flange 202 is provided on the cam support assembly 192 for supporting the inner continuous cam 204 and outer continuous cam 206. The cams 204 and 206 define an upwardly opening continuous cam path or track 208 which controls the path of movement of the continuously moving mold assemblies 64, which operation will be hereinafter described in detail. The cams 204 and 206 are secured to the flange 202 by a plurality of bolts.

ROTATING LOWER TABLE AND MOLD ASSEMBLIES

Referring to FIG. 3, the lower table 54 of the glass molding machine 50 is rigidly secured, by bolts 216, to the ring gear hub 170. The lower table 54 comprises a substantially cylindrical casting having an outwardly and downwardly tapered outer flange 218. The bolts 216 pass through the flange 218 and are threadably received in the annular upper face of the ring gear hub 170. Since the lower table 54 is rigidly secured to the ring gear hub 170, the lower table 54 rotates as a unit with the ring gear hub 170.

The lower table 54 has several functions. First, the lower table 54 movably supports and carries the mold assemblies 64 in their horizontal guided path of travel. Furthermore, the lower table 54 carries mechanism to be hereinafter described, which causes the proper movement of the mold assemblies 64 in the desired path of travel in accordance with the cam track 208. The lower table 54, as seen in FIG. 7, includes a plurality of cullet slots 220 which movably communicate or register with the cullet channel 196 in the fixed cam support assembly 192. Cullet passes through the slots 220 and into the channel 196.

Figure 8:
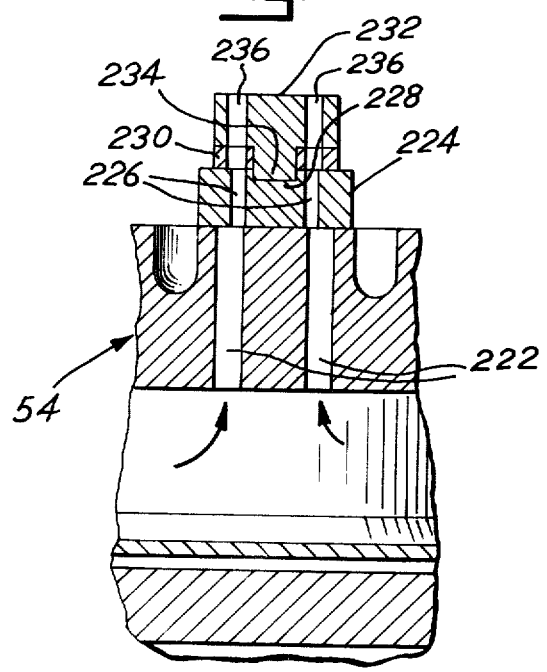
FIG. 8 is a sectional view taken along the line 8—8 of FIG. 7, showing another view of the cooling wind path.

As seen in FIGS. 7 and 8, a plurality of upright channels or openings 222 are located in the outer unitary portion of the rotating lower table 54 and movably communicate or register with the wind channels 200 in the cam support assembly 192. As the rotating table 54 moves in close proximity over the fixed cam support assembly 192, the cooling wind passes upwardly through the rotary table 54 for ultimate communication with the mold assemblies 64 carried by the lower table 54.

Referring to FIGS. 7 – 11, a mold slide support 224 is rigidly secured to the upper surface of the outer portion of the lower table 56. A pair of wind openings 226 in the slide support register with the wind openings 222 in the lower table 54 thereby continuing the path of travel for the cooling wind to the mold area. A central key-way, as best seen in FIG. 8, is mounted longitudinally of the slide support 224 and intermediate the wind openings 226. The slide support 224 is positioned radially on the upper surface of the lower table 54. A pair of key guides 230 are rigidly mounted on the upper surface of the slide support 224 and are position on opposite sides of the key-way 228 with a space defined therebetween which is a continuation of the key-way 228. A mold slide, generally 232, is positioned on the slide support 224 and guides 230 and includes a lower key 234 which is received within the key-way 228 for slidably guiding reciprocal movement of the slides 232 in a direction radial of the lower table 54. Wind openings 236 are also provided in the readial movable mold slide 232 and register with the wind openings 226 provided in the slide support 224 and in the key guides 230.

Figure 10:
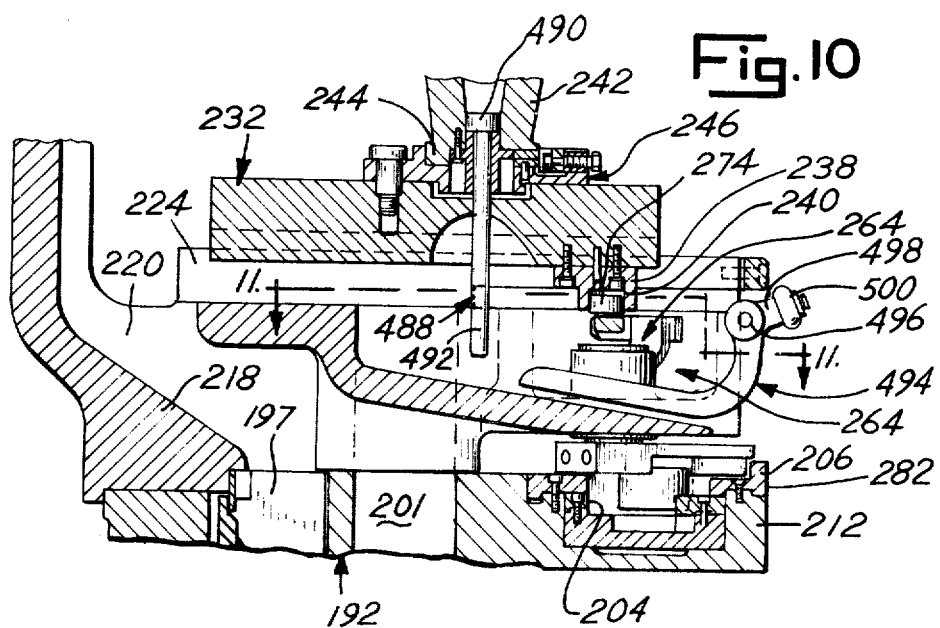
FIG. 10 is a vertical sectional view taken along the line 10—10 of FIG. 9 and illustrating the base, lower table, mold slides, and molds of the machine in the area of the delivery mechanism.
Figure 16:
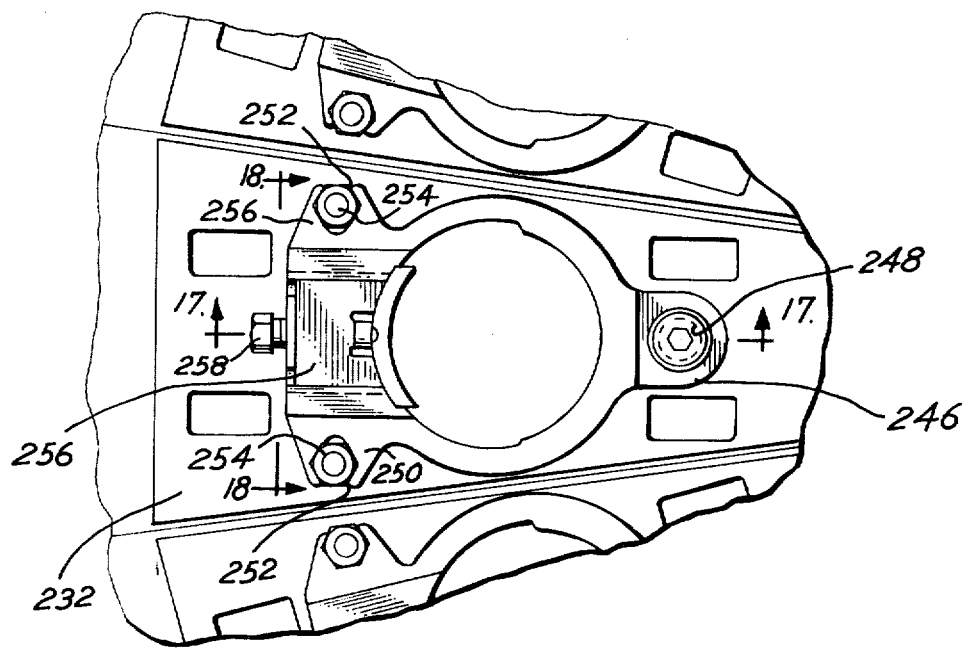
FIG. 16 is a detailed plan view of the top of an assembly for the molds on the lower table.
Figure 17:
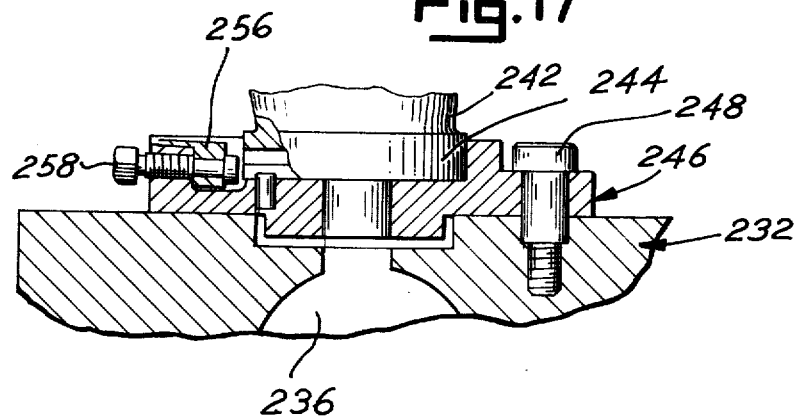
FIG. 17 is a sectional view taken along the line 17—17 of FIG. 16 showing the securement of the mold to the carriage or slide.
Figure 18:
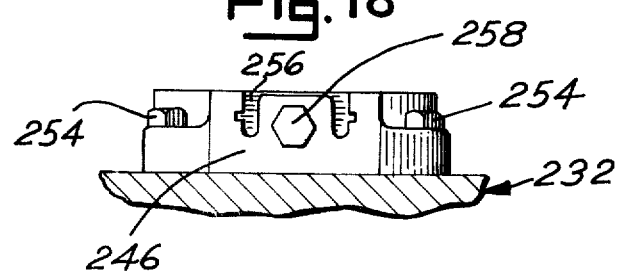
FIG. 18 is a view of the mold support viewed along the line 18—18 of FIG. 16.
Figure 23A:
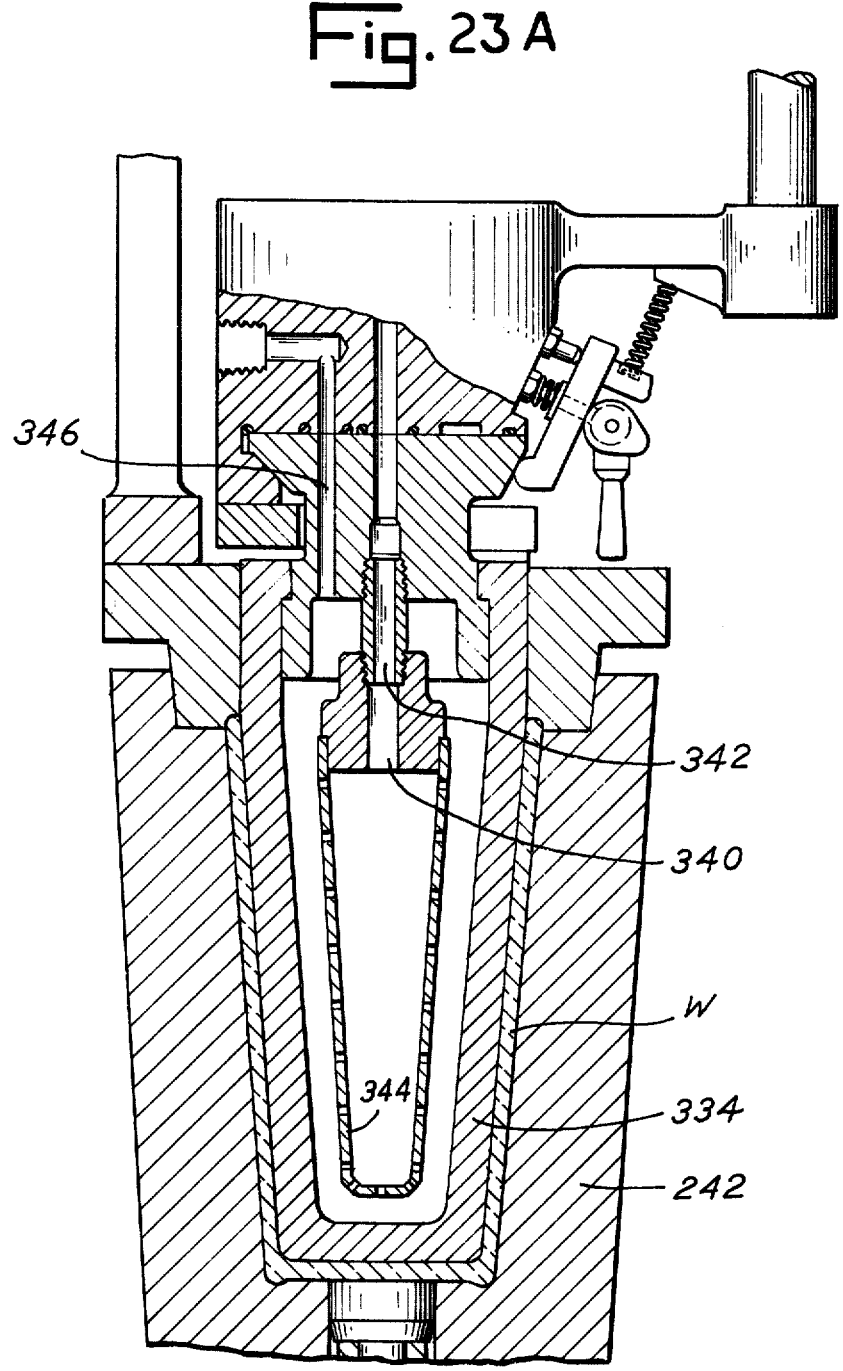
FIG. 23 is a detail sectional view, similar to FIG. 22, of the ram after it has been inserted into a mold.
Figure 28:
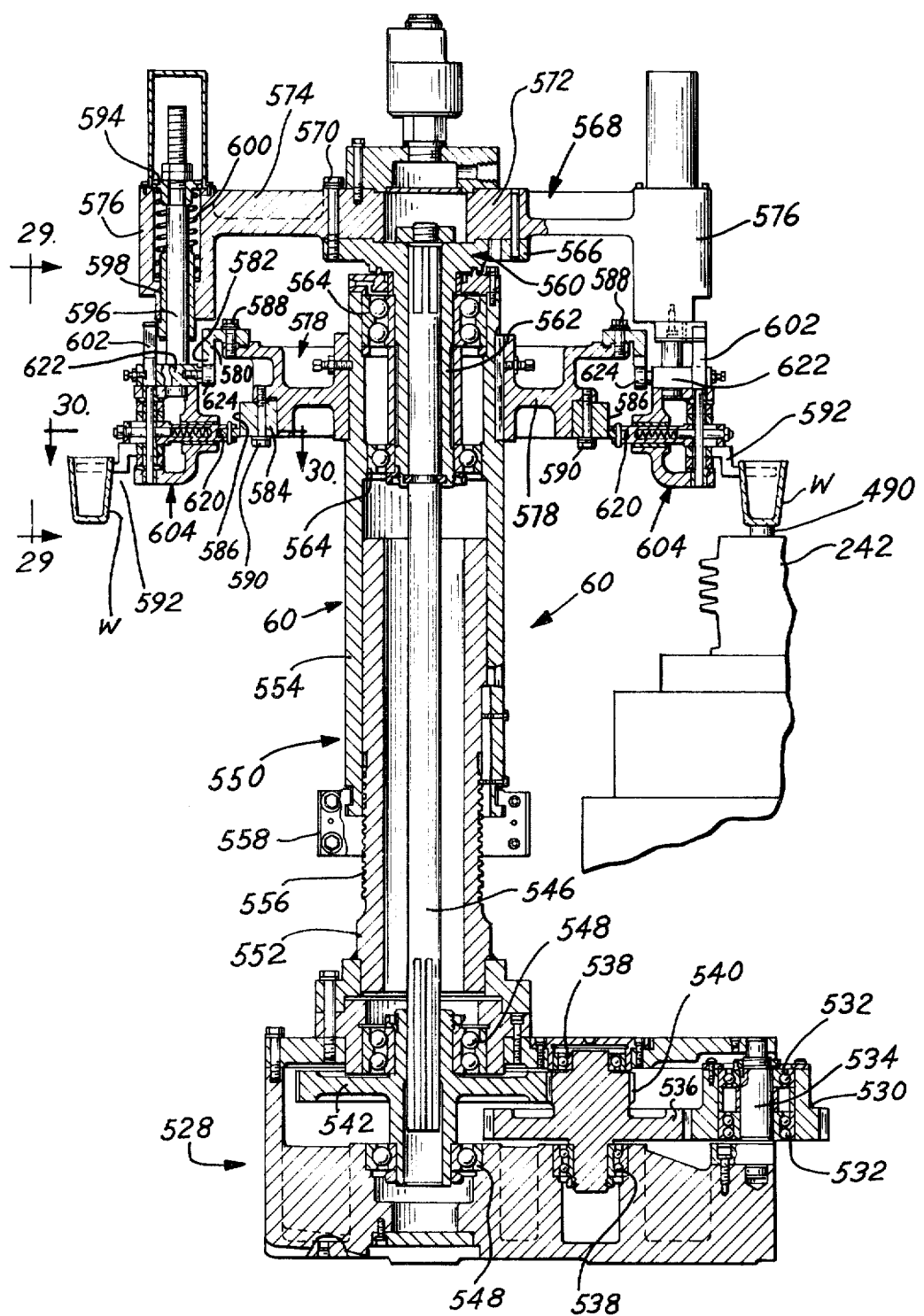
FIG. 28 is a vertical cross-sectional view of the take-out mechanism shown in FIG. 27.
Figure 29:
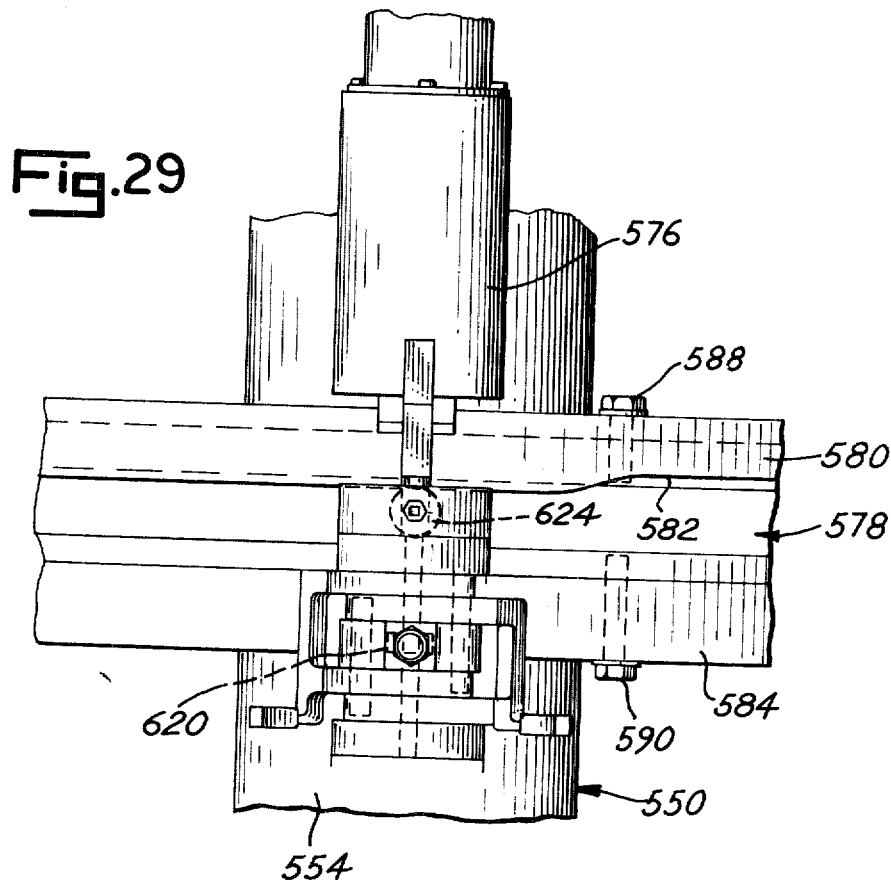
FIG. 29 is a detailed enlarged view taken along the line 29—29 of FIG. 28 showing the jaws of the take-out mechanism and the operating mechanism therefor.

Referring to FIG. 10, a rigid block 238 is rigidly secured to the underside of the outer portion of each of the slides 232. Each block 238, has a transverse groove 240 therein, as seen best in FIG. 11. Referring to FIGS. 10 and 16–18, the upper surface of each slide 232 carries a mold assembly 64. Each mold assembly 64 includes a mold 242 having an upward opening. The mold 242 is rigidly mounted in position by a mold basket assembly 246. Each mold 242 includes a bottom peripheral flange 244 which is used for locking the mold 242 rigidly in place on the slide 232. Each mold 242 is rigidly mounted on the upper surface of each slide 232 by the mold basket assembly 246. The mold basket 246 includes a bolt 248 at its inner end for securing the mold basket assembly 246 to the slide 232. The outer end of the mold basket 246 includes a pair of lateral wings 250 having laterally opening slots 252 therein. Bolts 254 are received within the slots 252 and are rigidly received within the upper face of the slide 232. The mold basket 246, as seen best in FIG. 16, is pivotally adjustable about the upright axis of the inner bolt 248, so that the position of the mold 242 on the slide may be adjusted, within limits, by the operator to a desired position for alignment of the plunger 334 with the molds 242. A clamp 256 is adjustably secured to the mold basket 246 by a locking bolt 258. The bolt 258 is tightened to secure the clamp 256 rigidly against the bottom flange 244 of each of the molds 242. The cooling wind passes against and around the molds 242 through the various wind channels, previously discussed, to effect the desired cooling thereof after a glass gob has been dropped therein and is being formed to the desired shape. As shown in FIGS. 23A and 28, the mold 242 is desirably provided with horizontal fins for greater heat exchange.

As will be hereinafter explained in greater detail, the molds 242 are continuously moved in a closed path of travel, the path of travel varying from an arcuate path of travel, having an inner radius, as, for example, a 30 inch radius, at the delivery position to an arcuate path of travel at the take-out position, having an outer radius, as, for example, a 40 inch radius. Additionally, at the delivery mechanism, the molds 242 are moved in a reverse arc which coincides with the path of travel of the delivery end of the delivery mechanism 58, which operation will be described hereinafter in detail. Also, in the take-out area, a similar reverse arc in the mold path of travel is provided. Furthermore, the molds 242 must be moved between the outer radial arc and the inner radial arc. In order to accomplish such a desired closed path of travel for the molds 242, bell crank assemblies, generally 263 and 264, are provided to operatively interconnect the slides 232 to the cam path 208.

Figure 9:
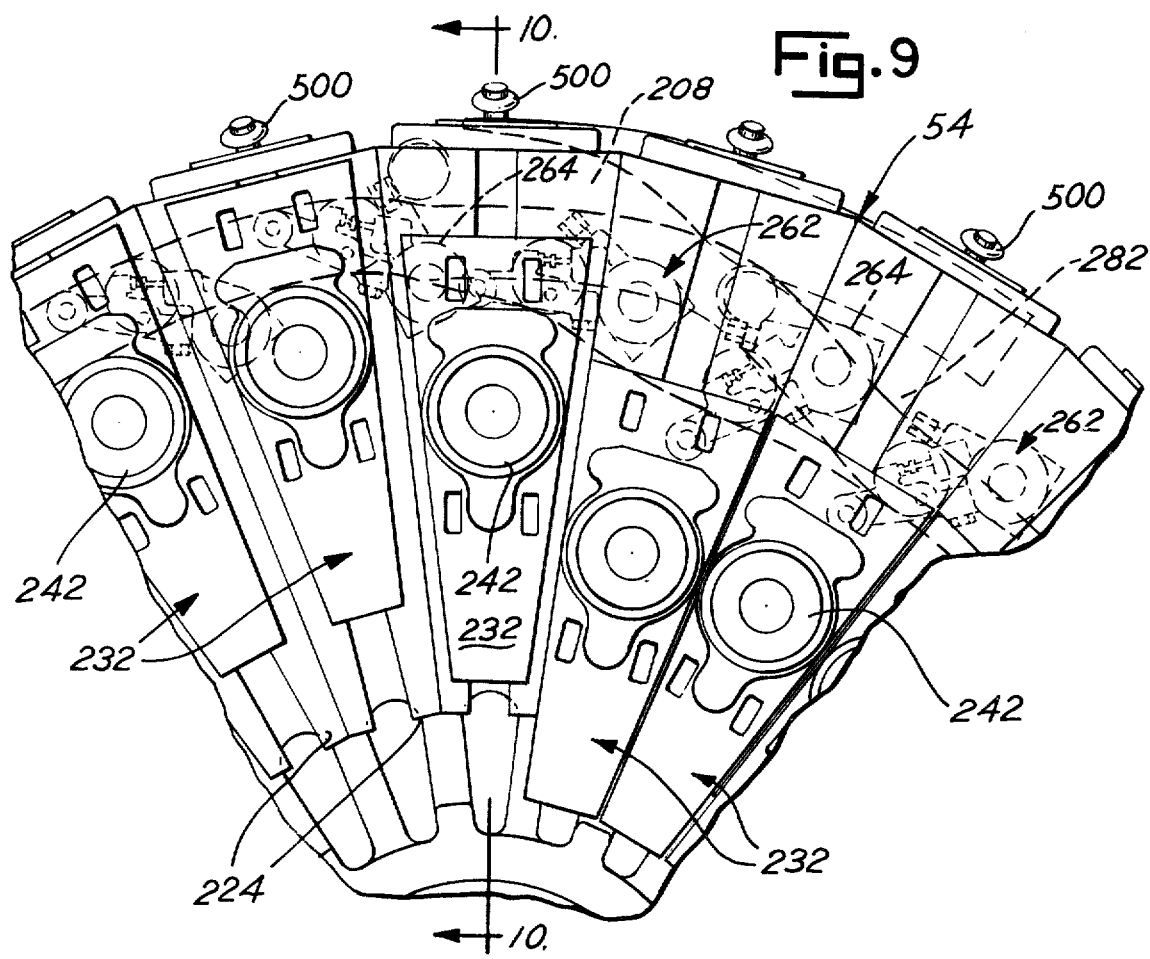
FIG. 9 is an enlarged, partially broken, top plan view of the base portion and lower table of the machine at the delivery section, and with the molds and mold carriages in place on the lower table of the machine.
Figure 11:
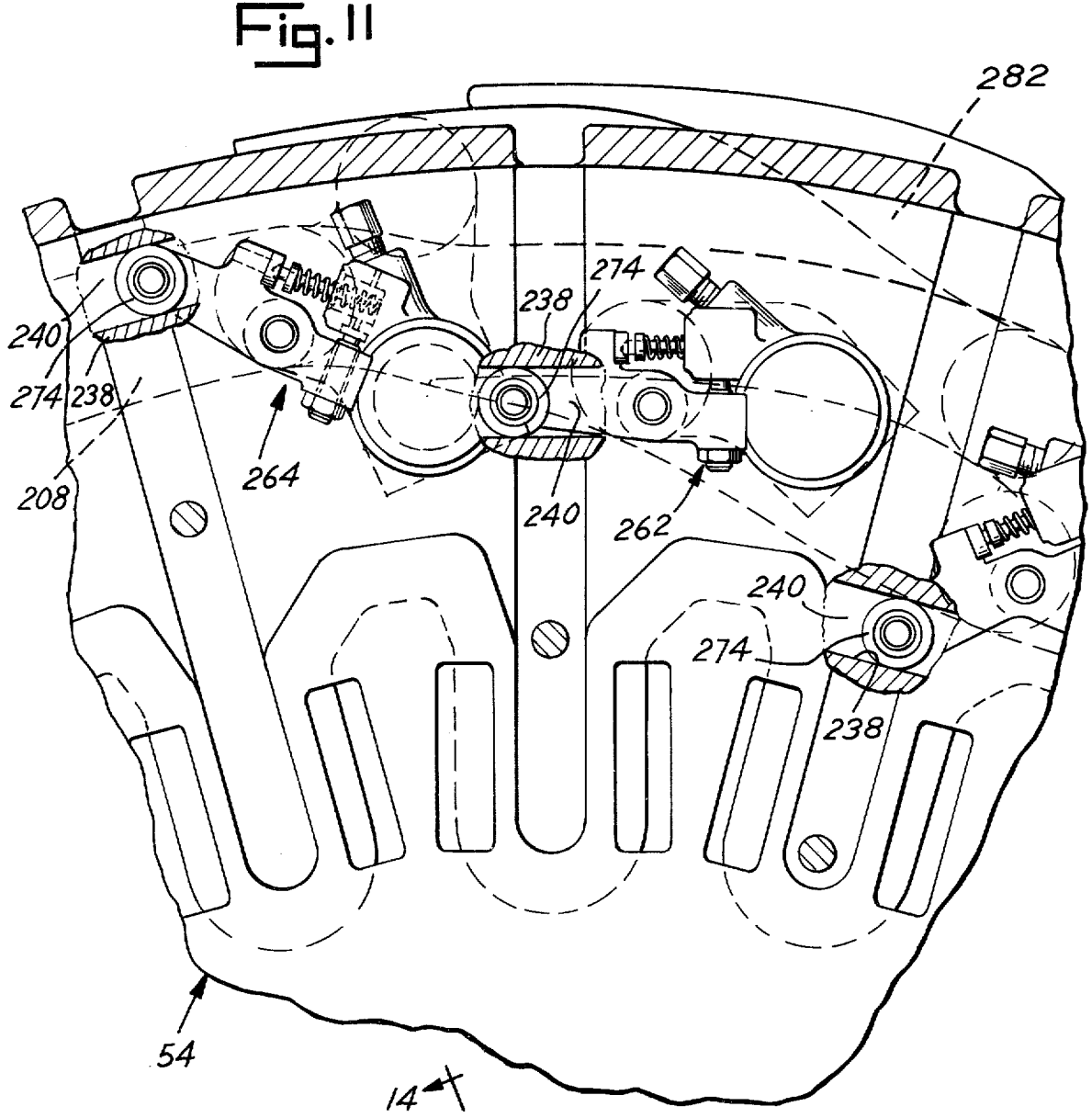
FIG. 11 is a further enlarged, partially broken, top plan view showing the cam means for guiding the molds along the desired path of travel.
Figure 12:
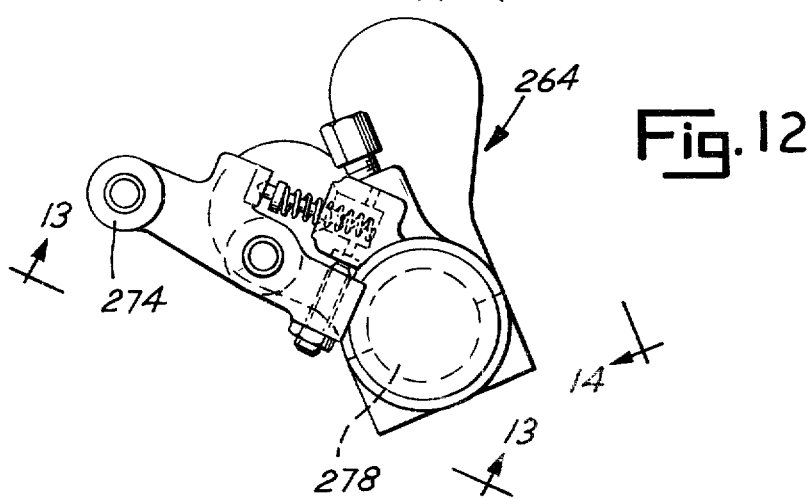
FIG. 12 is a detailed view of the cam crank assembly used for interconnecting the mold carriages with the cam means.

Referring to FIGS. 9 and 11, it is seen that the bell crank 262 and the bell crank 264 have substantially the same construction, except the bell crank 262 has a single lower arm while the bell crank 264 has a double lower arm. Since this is the only significant difference between the bell cranks 262 and 264, reference is directed to FIGS. 12 – 15, which illustrate the double bell crank assembly 264. An upright stepped shaft 266 is rotatably carried in an opening provided in the outer portion 268, of the lower table 54. A bearing 270 is positioned between the bell crank 264 and the flange 268 to provide the desired rotatable movement of the crank shaft 266 and the bell crank assemblies 262 and 264. Each bell crank assembly 264 includes an upper support arm 272 which has a roller 274 rotatably mounted at its upper and outer end. The roller 274 is slidably received within the transverse slot or groove 240 in the fixed block 238 on the bottom of the slide 232. Each bell crank assembly 262 and 264 also includes a lower support arm 276. Referring to FIG. 15, the lower support arm 276 of the double bell crank 264 includes a low cam follower roller 278 and a high cam follower roller 280 on the outer ends of the double arm 276. In contrast, the single bell crank assembly 262 has only a low cam follower roller 278. The cam rollers 278 and 280 are both rotatably mounted about an upright axis. The lower cams 278 on both the bell cranks 262 and 264 always follow along the cam track 208 located between the inner and outer cams 204 and 206.

Referring to FIG. 9, for example, a high cam 282 is located in the area of the delivery mechanism 58, only, for the purpose of moving one of a pair of molds 242 to the desired position during the delivery of two glass gobs in a double gob delivery system, described herein. It is to be understood that the machine 50 also readily works in a single gob system, without the need of the high cam 282 or double arm crank assemblies 264. The double gob delivery is used to deliver two gobs to each of two molds simultaneously. As the bell crank assemblies 262 and 264 are pivoted by the cam followers 278 and 280 moving in the cam path 208, the desired radial movement is imparted to the slides 232 so that the molds 242, while moving about the axis of the machine 50, are also moved radially, where desired. Such radial movements occur at gob delivery, at ware take-out, and between the 30 inch and 40 inch radial arcs of travel of the molds.

UPPER TABLE AND RAM ASSEMBLIES

Referring to FIGS. 22 and 23, the lower table 54 and upper table 56 are rigidly interconnected by a plurality of bolts 284. The lower table 54 includes an upper flange 286 and the upper table 56 includes a lower flange 288, the bolts 284 passing through both the flanges 286 and 288 to secure the tables 54 and 56 together. An upper bearing 290 is interposed between the inner cylindrical surface of the upper portion of the upper table 56 and the outer cylindrical surface of the upper portions of the outer portion of the central upright column 78. This bearing 290 cooperates with the lower bearing 182 to rotatably support and space the upper table 56 as well as the lower table 54 from the central column 78.

The upper table 56 comprises a unitary casting having a cylindrical inner portion 292 and a cylindrical outer portion 294. The bottom of the cylindrical outer portion is at a level which is approximately intermediate the upper and lower annular faces of the inner cylindrical portion 292. The upper end of the outer cylindrical portion 294 is positioned above the upper end of the inner cylindrical portion 292. The cylindrical portions 292 and 294 are rigidly interconnected and spaced from each other by a plurality of radial support ribs 296 which extend between the upper portion of the inner portion 292 and the inner portion of the outer portion 294, as best seen in FIG. 22.

The upper table 56 serves several important functions for the glass molding machine 50. One function is to support the ram assemblies 66. The upper table 56 supports the ram assemblies 66. The upper table 56 also supports the moving portions of the electrical, hydraulic, and air lines and controls which operate the ram assemblies 66. Such portions must pass from the stationary center column 78 to the rotating control and operating parts mounted on the rotating upper table 56.

A plurality of support brackets 298 are rigidly secured to the upper end of the outer cylindrical portion 294 of the upper table 56. The support brackets 298 have electrical control boxes 300 mounted thereon in an upright position, on their outer surfaces. The electrical control boxes 300 have electrical controls which operate the ram assemblies 66 for properly timing the dropping of the glass gobs into the mold baskets 242.

The outer face of the outer cylindrical portion 294 of the upper table 56 has a plurality of press head assemblies, generally 302, rigidly mounted in an upright position thereon. Each press head assembly 302 includes a cylinder-defining support portion 304 which is rigidly mounted by bolts 306 to the table 56. A key and keyway arrangement 308 provides proper alignment between the press head assemblies 302 and the upper table 56.

Each press head assembly 302 includes a lower portion which defines an air chamber 310. The upper portion of each press head assembly 302 has a support arm 312 which carries a hydraulic press cylinder 314 at its upper end. The press cylinder 314 is rigidly secured in an upright position to the upper face of the arm 312 by a plurality of bolts 316 which pass through the lower flange 318 of the press cylinder 314 and are received within the upper ring-like end of the support arm 312. Referring to FIG. 23, a hydraulic ram rod 320 projects downwardly from the press cylinder 314. In FIG. 22, the ram rod 320 is in the raised position while, in FIG. 23, the ram rod 320 is shown in the lowered position.

The cylinder portion 310 of the support member 304 has an upper wall 322 and an open bottom. A hollow plunger or piston 324 is reciprocally mounted within the cylinder 310. The upper end of the hollow plunger 324 includes an upwardly projecting cylindrical guide stem 326. A seal member 328 is rigidly secured within a channel provided in the upper wall 322 for sealably and slidably carrying the guide stem 326 of the plunger 324.

A guide ring holder 330 is rigidly secured to the bottom annular portion of the plunger 324 and rigidly carries a horizontal ring guide 332. As will be hereinafter described, and as generally shown in FIG. 23, the guide ring 332 functions to seal or close the annular open space defined between the ram head 334 and the mold basket 242 so that the ware or glass product W as seen in FIG. 23, is provided with a properly formed ring-like upper end. Ring seals 338 are provided in the outer cylindrical wall of the plunger 324 for sealably and slidably bearing against the cylindrical inner surface of the chamber 310.

A connecting rod 336, is slidably and sealably received centrally of the plunger 324 and axially of the ram rod 320. A coupling 337 rigidly interconnects the ram rod 320 and the rod 336. The hollow connecting rod 336 includes a central channel through which cooling air passes to the interior of the ram head 334. As seen in FIG. 23A, the ram head 334 is a hollow member having an air opening 340 which communicates with a central air channel 342 in the connecting rod 336. The air channel 342 is connected to an air distributor head 344 having air apertures therein for directing air against the inner face of the ram head 334. Channel 346 is provided for exhausting the cooling air upwardly through the ram head 334.

A ram guide support 348 as rigidly secured to the upper end of the ram body 334 and includes a laterally extending arm 350 with an aperture at the outer end thereof. The aperture fixedly receives an upright guide rod 352 which also slidably passes through an aperture provided in a laterally projecting flange 354 at the outer portion of the support body 304. A guide arm 355 is secured to the bottom of the plunger 324 and the guide rod passes through an aperture therein. The guide rod 352 thereby provides radial positioning of the ram body 334 and plunger 324 during descent to the mold body 242. As shown in FIG. 23, the plunger 324 descends with the guide ring 332 until the guide ring 332 is moved into position to close the upper end of the space between the mold basket 242 and ram head 334. Since the ram assemblies 66 are movable in a circular path of travel and are received by the mold baskets 242 during the forming of the ware W, it is necessary for the ram assemblies 66 to move in unison with the molds. This unified movement is accomplished by rigidly securing the lower table 54 to the upper table 56, as described above. At the same time, air lines, hydraulic lines, and electric lines are brought to the machine 50 through the stationary casting 70 and through the upright column 78. For example, electric lines in the column 78 for interconnection to the electrical control boxes 300 are stationary while the electric boxes 300 rotate with the upper table 56. Also, pressurized hydraulic fluid must be brought from a non-moving source to the rotating press cylinders 314. Similarly, air must be brought to the plunger 324. Suitable provision is made for bringing the various hydraulic, air and electrical lines from a stationary condition to a moving condition.

With respect to the hydraulic system, a non-moving hydraulic supply line 356 sealably interconnects with the fixed section 338 of a hydraulic distributor, generally 360. The hydraulic distributor 360 also includes a rotating section 362, which is fixedly secured to the rotary upper table 56 and adjacent the rotating section 362. Suitable pressure seals (not shown) and channels (not shown) are provided in the hydraulic distributor 360 for causing the pressurized hydraulic fluid to enter the fixed section 358 through an inlet 364, from the hydraulic supply line 356. The pressurized fluid passes then through the pressure outlet 366 of the rotating section 362. As indicated by the dotted line, a hydraulic outlet line 368 extends to the valve assembly 370 which moves with the upper table 56. The hydraulic line 368 interconnects to the valve assembly 370 and pressurized hydraulic fluid passes from the valve 370 through the hydraulic line 372, indicated by the dotted line, to the inlet 374 provided on the upper end of the hydraulic press cylinder 314.

The lower end of the press cylinder 314 includes an outlet opening 376 which interconnects to a hydraulic fluid exhaust line 378, indicated by a dotted line, which returns to the valve assembly 370. The fluid exhausts from the valve assembly 370 to a return line 380, indicated by a dotted line, which interconnects to the rotating section 362 of the hydraulic distributor 360. A hydraulic exhaust line (not shown), similar to the hydraulic supply line 356, is interconnected to and extends from the fixed section 358 of the hydraulic distributor 360 for return of the hydraulic fluid back to a supply tank (not shown).

Pressurized air acts within the air chamber 310 to drive the plunger 324 downwardly so that the guide ring 332 bears against the mold 242 to enclose the space between the ram head 334 and the mold 242. An air line 384, indicated by a dotted line, extends from an air port 386 located in the cylinder support 304 to an air line 388, which is fixedly interconnected to a rotary portion 390 of an air distributor assembly 392. The air distributor assembly 392 has its rotating portion 390 fixedly secured to the upper end of the rotating upper table 56 by a plurality of bolts 394. A fixed section 396 of the air distributor housing 392 is fixedly interconnected to the upper end of the central column 78 by a plurality of bolts 398. The air pressure imparted to the air pressure chamber 310 through the air port 386 is used to control the amount of pressure holding the guide ring 332 in place against the mold 242. The movement of the plunger 324 during the downward movement of the ram head 334 is accomplished by the air supply which interconnects the air chamber 310 through an inlet opening 386, provided in the head of the cylinder support 310, to the air line 384. The air line 402, indicated by a dotted line, is interconnected to the rotating portion 390 of the air distributor assembly 392 at the air inlet 404. After air pressure has moved the plunger 324 down to or near the full down position, controlled spring air pressure is imparted, through inlet 400 and line 402, to the chamber 310.

A cooling air inlet 406 is located in the outer wall of the cylinder support 304. The inlet 406 communicates with grooves (not shown) along the inner surface of the chamber 310 which grooves communicate with suitable inlet apertures 407 in the wall of the hollow plunger 324. The ram head 334, when in the down position in the mold 242, has cooling air entering the air inlet 406 and ultimately passing therethrough into the hollow interior of the plunger 324, through the distributor 340, as seen in FIG. 23A. Apertures 408 are located in the wall of the connecting rod 336 so that cooling air passes through the air line 342 in the connecting rod 336 and down into the distributor head 344 in the ram head 334. The exhaust line 346 discharges the cooling air from within the plunger or ram head 334.

An air seal assembly, generally 409, is interposed between the fixed section 396 and the rotary section 390 of the air distributor assembly 392. The air seal assembly 408 provides a rotary seal between these two relatively moving parts and also isolates three separate sources of air supply from each other during passage to the cylinder chamber 310. The main air supply from the space 92 passes through a channel 410 in the upper part of the central column 78, which channel 410 commmunicates with channels 412 in the fixed section 396 of the air distributor assembly 392. The air passes from the channel 412 through suitable apertures provided in the lower section of the air seal assembly 409. The air passes through the air line 384 through the air port 386 for moving the plunger 324 and guide ring downwardly.

When the guide ring 332 is in its full down position, the air supply therefor is shut off by suitable controls, and the controlled air pressure from the air spring line 402 controls the amount of air spring pressure acting on the guide ring 332 in the down position. The air spring air passes upwardly through the annular channel 98 in the central column 78 and passes through openings provided in the upper end thereof. The air passes through a lateral opening in the rotating section 390 of the air distributor assembly 392. The air spring air then passes through a suitable aperture 413 provided in the central section of the rotary air seal assembly 409 and passes outwardly through the lines 388 and 384 and into the air port 386 for passage to the chamber 310.

As to the cooling air for the ram head interior, the cooling air passes through the channel 106 and then through the lateral port 414 in the fixed section 396 of the air distributor assembly 392. The air passes through a suitable aperture in the upper seal of the air seal assembly 409, and then outwardly through the air lines 415 and 417. The cooling air then passes to the air cooling inlet 406 in the chamber 310. The plunger cooling air, the air spring and the main air thereby all pass from the fixed central column 78 into an air distributor assembly 392 with the seal assembly 409 providing suitable seals between the rotating and fixed parts of the assembly 409, the seals also providing isolation of the three air lines from each other.

In addition to the hydraulic lines and air lines which are used for each of the ram assemblies 66, various electrical controls are used in properly sequencing the movement of the rams 66 with the hydraulic and air lines, individual electrical control boxes 300 are used for each ram assembly 66. Electrical wires (not shown) must interconnect to the moving or rotating electrical boxes from an electrical source coming from a fixed or stationary source. An electrical slip ring assembly, generally 416, includes a fixed support section 418, and a rotating support section 420. The rotating support section 420, of the slip ring assembly 416 is secured to the rotating section 362 of the hydraulic distributor 360 while the fixed support section 418 is secured to the fixed section 358 of the hydraulic distributor 360. An electrical power supply (not shown) is interconnected to the fixed support section 418. A ring 422 defines a bearing assembly to support the water slip ring section 428. The rotating electrical ring is mounted on the rotating support section 420 with wires (not shown) interconnected between water tube section 428 and the electrical slip ring support 420 and pass outwardly from the support casting for the rotating section 362. Member 428 carries a conventional slip ring (not shown) for water which can be selectively used instead of air for cooling the ram head 334.

DELIVERY MECHANISM

The delivery mechanism 58 drops glass gobs into the molds 242. This phase of the operation and construction of the machine 50 is critical because the delivery mechanism 58 must deliver the glass gobs to the molds 242 while both the delivery mechanism and baskets are moving. This operation provides continuous machine movement and avoids the intermittent or indexing operation used in most prior art machines.

Figure 19:
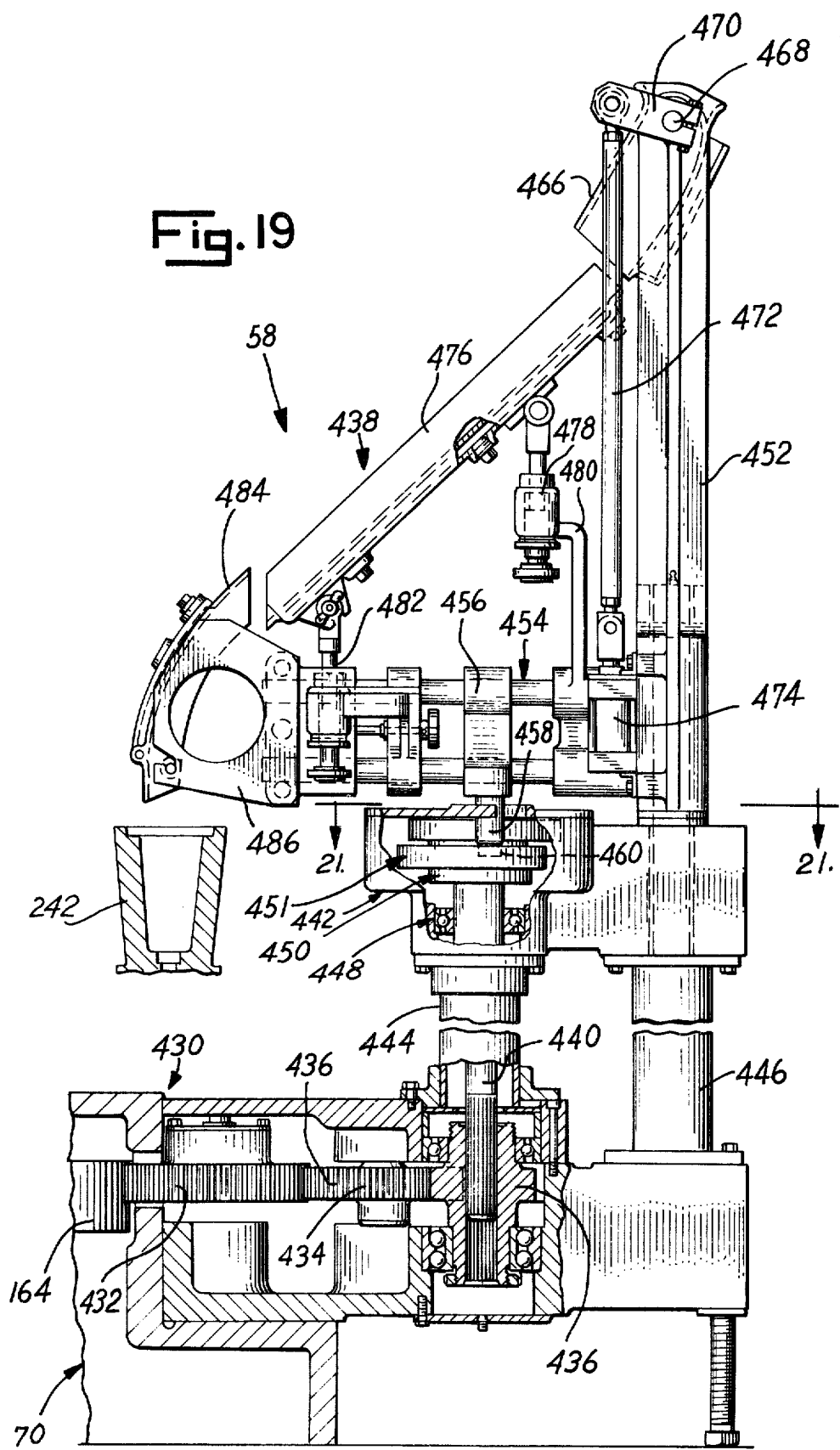
FIG. 19 is a side elevational view, partially in section, of the glass delivery mechanism for the embodiment of FIG. 1.
Figure 20:
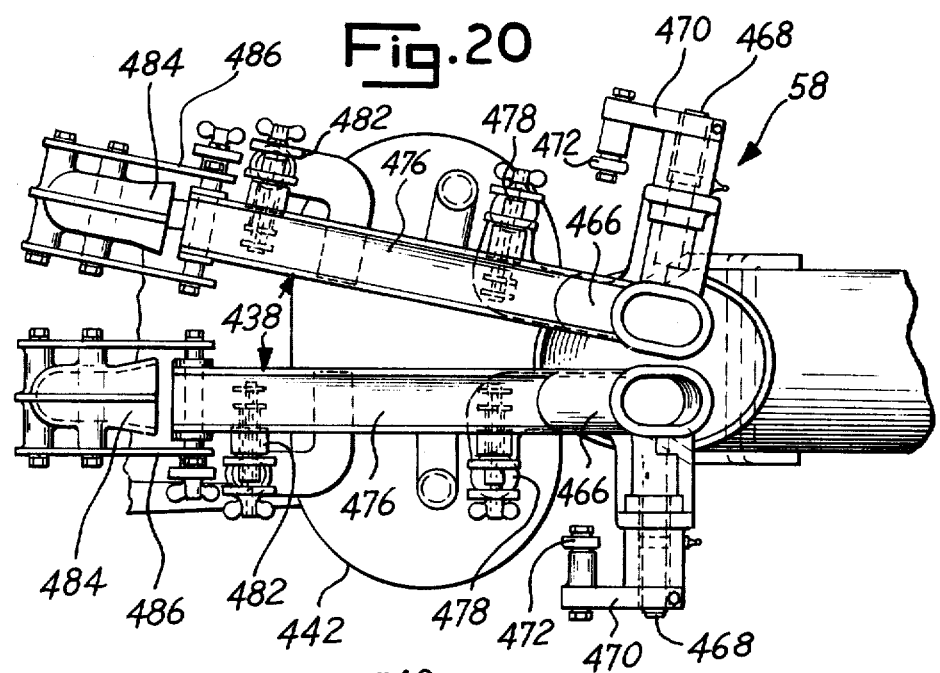
FIG. 20 is a top plan view of the delivery mechanism shown in FIG. 19.
Figure 21:
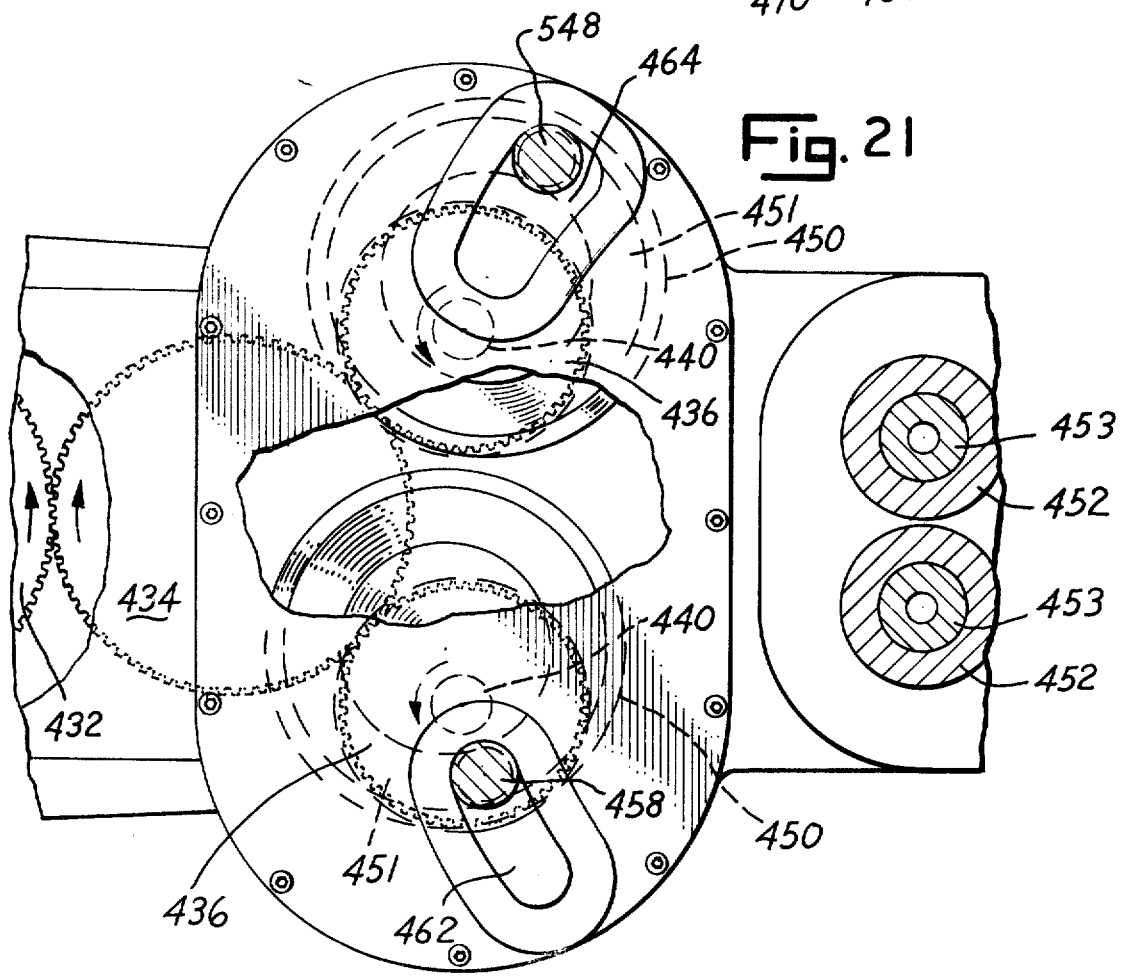
FIG. 21 is a cross-sectional view taken along the line 21—21 of FIG. 19 showing the drive mechanism for reciprocally moving the delivery mechanism.

The delivery mechanism 58 is shown best in FIGS. 19–21. The delivery mechanism 58 is shown as a double gob delivery system. It is to be understood, however, that the invention may readily be used in connection with a single gob system. Furthermore, the shear mechanism for discharging properly sized and sequenced glass gobs to the delivery mechanism shown in FIGS. 19–21 is accomplished by conventional mechanism not shown or described herin.

The delivery mechanism 58 includes a combination gear box and support assembly, generally 430, which, as shown best in FIG. 2, is rigidly interconnected to the base assembly 52 and operatively connected to the drive mechanism 62. A drive pinion 432 meshes with the ring gear 164, which is located in the base 52. The drive pinion 432 meshes with an idler gear 434, which in turn, meshes with each of a pair of driven gear 436. The gears 432, 434, and 436 are all rotatable about upright, parallel axes and are rotatably mounted within the gear box assembly 430.

The delivery mechanism 58, as shown in FIG. 20, includes a pair of glass gob delivering mechanisms, generally 438. Since the mechanism for both the gob delivery mechanisms 438 have substantially the same structure, only one such mechanism will be described in detail. A vertical, partially sectioned, side elevational view of one of the gob delivery mechanisms 438 is shown in FIG. 19. In FIGS. 20 and 21, the plan views show portions of both the gob delivery mechanisms 438. Both mechanisms operate in substantially the same way, with their outer ends oscillating through an arc of approximately 7-½°. As previously described, the glass gobs are delivered to both molds 242 substantially simulataneously as both the molds 242 and delivery mechanisms 438 are moving or "on the fly."

Referring to FIG. 19, the driven gear 436 is non-rotatably mounted on an upright splined shaft 440 which is rotated by the gear 436. The shaft 440 extends upwardly into a cam support housing 442. A hollow support column 444 extends upwardly from the top of the support assembly 430 and is fixedly mounted on the underside of the cam housing 442. The support column 444 also protectively surrounds the upright drive shaft 440. The outer portion of the support assembly 430 has another hollow support column 446 which extends from the top of the support housing 430 to the underside of the cam housing 442.

A bearing 448 is positioned within the cam housing 442 to rotatably support the upper end of the upright shaft 440. The upper end of the upright shaft 440 has a cam plate 450 fixedly mounted thereon. A continuously upwardly opening cam track 451 is provided therein, as shown in FIG. 21.

An upright support column 452 extends upwardly from the top of the cam housing 442 in substantial axial alignment with the support column 446 located therebelow. The column 452 is rigidly secured to the top of the cam housing 442. A fixed pivot shaft 453 is mounted within the cam housing 442 and rotatably supports the support column 452.

A delivery support arm assembly, generally 454, extends inwardly towards the center of the machine 50 from the column 452. The support arm assembly 454 is secured at its pivot end to the pivotable column 452. A support leg 456 extends downwardly from and is secured to the arm 454. A cam follower support 458 is mounted at the lower end of the leg 456. The cam support 458 has a cam roller follower 460, shown in FIG. 19, mounted at its lower end. The roller 460 is guidably received within the upwardly opening cam track 451 provided in the cam plate 450.

Arcuate openings 462 and 464, of slightly different shape, are provided in the upper walls of the cam housing 442 for accommodating the oscillating movement of the cam support rod 458 mounted within the openings 462 and 464. The oscillating movement is caused by the eccentricity of the rotary cam 450. The shape of the openings 462 and 464 are both substantially arcuate although the opening 464 has a slightly different shape than the opening 462 because of the slightly different motion imparted to the one gob delivery mechanism 438 than is imparted to the other of the mechanisms 438, the cam tracks 451 also being slightly different from each other.

The upper end of the support column 452 has a scoop 466 pivotally mounted thereon for movement about a horizontal axis which is positioned substantially transverse to a radial line extending from the central axis of the glass making machine 450. The scoop 466 has an open upper end which is adapted to receive one of the pair of simultaneously dropped glass gobs used for forming the ware W. The scoop 466 also has an open lower end and is enclosed on its top, bottom and sides. The scoop 466 is mounted on a pivot shaft 468. A crank arm 470 is pivotally secured to a connecting rod 472 which interconnects to the upper end of an air cylinder assembly 474. If for any reason, a particular mold 242 is inoperative, the air cylinder 474 is actuated so as to pivot the crank arm 470 and thereby the scoop 466 into a downward position so as to direct a glass gob into a cullet chute (not shown).

In normal operation, a glass gob passes down the scoop 466 into a downwardly inclined and elongated trough 476 which is positioned adjacent the scoop 466. The trough 476 has a closed bottom and sides and an open top. The trough 476 is adjustably supported in a vertical plane at its upper portion by an adjustable upper support bracket 478. The bracket 478 is rigidly interconnected at its lower end to the support leg which extends upwardly from and is rigidly connected to the lateral support arm 454. The lower end of the trough 476 is secured to the adjustable bracket 482 mounted at the outer end of the arm 454.

After the gob passes from the trough 476, it strikes the deflector 484 which deflects or directs the glass gob downwardly into the mold 242. The deflector 484 has a closed outer wall and enclosed side walls and opens inwardly to properly receive and deflect the gob into the mold 242. The deflector 484 is adjustably positioned in a vertical plane relative to the trough 476 by a deflector support 486 mounted on the outer end of the arm 454.

Each of the gob delivery mechanisms 438 is oscillated through an approximately 7-½° arc by the movement of the cam roller 460 in the cam track 451. The oscillation is about the pivot shaft 453. The radial movement of the deflector substantially coincides with the path of travel of the mold 242 so the gob is properly dropped therein.

TAKE-OUT MECHANISM

After the ware W has been formed from the gob and cooled into a hardened and set condition, the ware W must be removed from the molds. This is accomplished by the take-out mechanism 60. The take-out mechanism 60 is shown most clearly in FIGS. 10 and 24–31. After the ware W has been completely formed in the mold 242, the ware W must be moved upwardly or lifted out of the mold. Prior to lifting the ware W, the ram head 334 is moved out of the mold. The mold 242 is then moved from a 30 inch radial arcuate path of travel into the 40 inch radial arcuate path of travel.

Referring to FIG. 10, the bottom of the cavity in the mold is closed off by a lift rod assembly which includes a plug 490 which sealably closes the bottom of the mold cavity. The rod assembly 488 includes a kick-up rod 492 attached to the plug 290 having a downwardly facing lower end. In FIG. 10, the mold 242 is shown while in the 30 inch radial path of travel. By cam operation, the molds 242 are moved laterally outwardly to a 40 inch radial arcuate path of travel so the bottom face of the kick-up rod is in position above a kick-up arm 494. Each kick-up arm 494 is a substantially L-shaped member having an elongated portion positioned to extend underneath the kick-up rod 492. The arm 494 is pivotally mounted about a pivot pin 496 having a horizontal axis which is transverse to a radius from the central axis of the machine 50. The pivot pin 496 is fixedly mounted to the outer periphery of the upper table 56. An outwardly extending projection 498 extends from the arm 494 and rotatably carries a cam follower roller 500. One arm assembly 494 is provided for each mold basket.

Referring to FIGS. 24–26, a kick-up cam support assembly, generally 502, and a return cam support assembly, generally 504, are rigidly mounted on the base 52, each being adjacent but on opposite sides of a take-out support housing 550. The kick-up cam support assembly 502 is rigidly secured to the base and to the housing 550 by a plurality of bolts. A cam plate 508 is rigidly mounted to the support 502 and includes a downwardly tapering cam face 510 which is arranged to engage the roller 500 for pivoting the kick-up arm 494 upwardly for lifting the kick-up rod 492 and moving the ware W upwardly out of the mold 242, as shown in FIG. 28.

Following removal of the ware W from the mold 242, it is important to assure that the plug 490 of the kick-up rod assembly 488 is returned and properly seated in the bottom of the mold cavity. For this purpose, a return cam plate 512 is mounted on the return cam support assembly 504. The return cam plate 512 has a cam face 514 which faces upwardly and is arranged to intercept the roller 500. As seen, the cam face 514 assures that the kick-up arm 494 is moved to the down position so that the kick up rod assembly 488 may drop without interference into proper position within the mold 242.

As shown in FIG. 25, the kick up cam plate 508 is vertically adjusted by sliding the plate 508 upwardly or downwardly relative to the support 502. For this purpose, slots 516 are provided in the cam plate 508 and bolts 518 are secured for locking the cam plate 508 and cam face 510 into the proper position. Similarly, an adjustable support bracket 520 is provided for the return cam plate 512. The cam plate 512 is pivotally movable about a pivot pin 522. A slidable rod 524 is received by the brackets 520 and a compression spring 526 is provided to normally bias the return cam plate 512 to the solid line position shown best in FIG. 26.

Referring to FIG. 28, a gear box and take out assembly support housing 528, rigidly mounted to the base 52, includes a driven gear 530 which meshes with the ring gear 164. The driven gear 530 is rotatably carried by bearings 532 which are secured on an upright shaft 534 mounted in the housing 528. The driven gear 530 meshes with an idler gear 536 which is rotatably mounted on bearings 538 which are mounted in the housing 528. An upper gear 540, unitary with the gear 536 is mounted coaxially above the lower idler gear 536. Since the lower gear 536 is driven by the driven gear 530, the upper gear 540 is also driven thereby. The upper gear 540 meshes with a driven gear 542 which is non-rotatably mounted to the lower end of an upright splined drive shaft 546. The driven gear 542 is rotatably carried in the housing 528 by upper and lower bearings 548.

The vertically adjustable support column or housing 550 is rigidly secured to the top of the support housing 528 and is concentrically mounted around the upright drive shaft 546. The column 550 includes a fixed lower section 552 and an adjustable upper section 554. The lower portion of the lower section 552 is threaded at 556. A coupling 558 is secured to the lower end of the upper section and threadably engages the threaded portion 556 of the lower section 552 of the column 550. The vertical adjusted height of the take-out mechanism 60 is thereby adjusted to compensate for differences in the height of the ware W being processed in the molds 242.

A flanged coupling 560 is non-rotatably received by the upper splined end of the shaft 546. The coupling 560 includes a downwardly elongated hub portion 562. A pair of spaced bearings 564 rotatably support the coupling relative to the upper section 554 of the support column 550. The flange coupling 560 includes a flange 566, which is ridigly interconnected to a take-out arm support assembly, generally 568. A plurality of bolts 570 extend through the hub portion 572 of the assembly 568 and also through the flange 566 to accomplish the rigid interconnection therebetween. A plurality of arms 574 extend radially outwardly of the hub 572 and terminate in a plurality of upright cylindrical housings 576.

The upper end of the upper section 554 of the column 550 has a cam support 578 rigidly mounted thereon. The cam support 578 carries a continuous upper cam 580 with a downwardly facing cam face 582. The cam support 578 also rigidly carries a lower cam 584 having an outer cam face 586. The upper cam 580 is rigidly secured to the outer periphery of the upper portion of the cam support 578 by bolts 588. The lower cam 584 is rigidly secured to the lower peripheral portion of the cam support 578 by bolts 590. As will be described hereinafter, the upper cam 580 raises and lowers the ware gripping arms 592 while the lower cam 584 opens and closes the gripping arms 592 for grasping the ware W and depositing the same on the conveyor 68.

Each cylindrical housing 576 has a mounting flange 594 at its upper end for adjustably receiving a guide rod 596 therein. A support sleeve 598 is slidably carried on the guide rod 596 and interior of the cylindrical housing 576. A compression spring 600 is attached at one end of the mounting flange 594 and at the lower end of the sleeve 598 to normally urge or bias the sleeve 598 upwardly. A support arm 602 is rigidly secured to the sleeve 598 and carries the gripping arm support assembly 604 at its lower end.

Figures 30, 31:
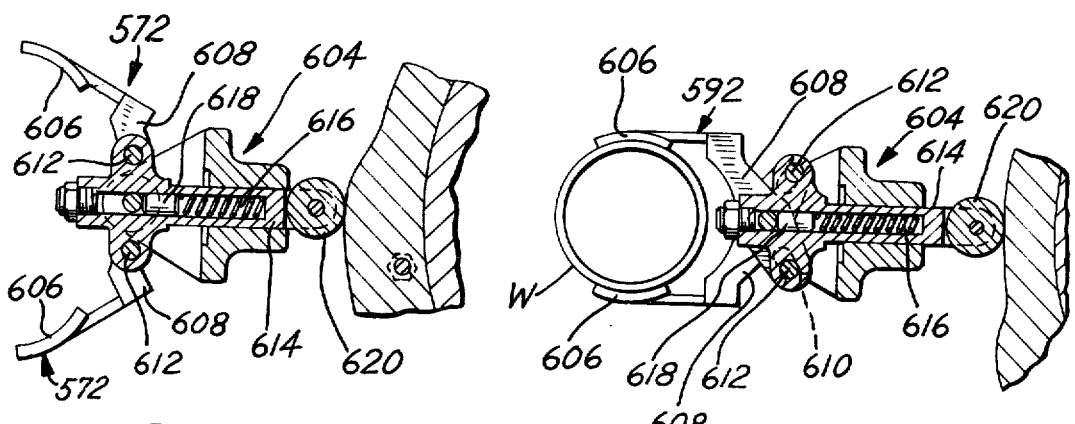
FIG. 30 is a partially sectioned plan view of the take-out jaws in the open position.
FIG. 31 is a view similar to FIG. 30, the take-out jaws being shown in the closed position on a glass article being removed from a mold.

As best shown in FIGS. 30 and 31, the gripping arms 592 include gripping portions 606 and rearward link portions 608. The rear end of each link portion 608 includes a slotted portion 610 which engages a pin 612 in the arm support 604. A hollow shaft 614 is transversally and slidably received by the arm support assembly 604. A spring 616 is provided therein and is located between the plug 618 and the closed end of the shaft 614. The outer end of the plug 618 engages the rod shaped arm 602. The outer end of the shaft 614 rotatably carries a cam follower roller 620 which engages the outer face 586 of the lower cam 584. As seen in FIGS. 30 and 31, the cam 584, in cooperation with the cam roller 620 opens and closes the gripping arms 592. A cam roller support 622 is mounted on the upper side of the gripping arm support assembly 604. The support 622 rotatably receives a cam follower roller 624 which engages the lower cam face 582 of the upper cam 580. The roller 624, in cooperation with the cam face 582 moves the gripping arm assembly up and down for the desired amount for receiving and thereafter placing the ware W on the conveyor 68.

OPERATION

In the description of operation of the glass molding machine 50, reference will be made throughout to FIG. 1A, which is a chart schematically indicating the operational cycle of the continuous molding press 50.

In the description of the operation of the machine 50, it is to be understood that for any given glass product to be made thereon an operation must "set up" the equipment, that is, place the proper molds 64 in proper place on the machine, adjust the size of the glass gob to be dropped into the mold, place the proper ram heads on the machine, properly time the dropping of the glass gob into the desired position in the mold, adjust the speed of the machine, etc. The description herein relates primarily to the continuing operational cycle of the mechanical components of the machine 50, and there will be no specific discussion of the set-up work required for the machine 50. As mentioned earlier, the machine 50 shown and discussed herein has a double gob delivery mechanism which simultaneously delivers a glass gob to each of a pair of molds. It is to be understood, however, that the machine 50 may be readily adapted to a single gob delivery mechanism. The gob shear mechanism used for providing a molten glass gob or gobs of the desired size is a conventional mechanism which will not be discussed herein.

Figure 1A:
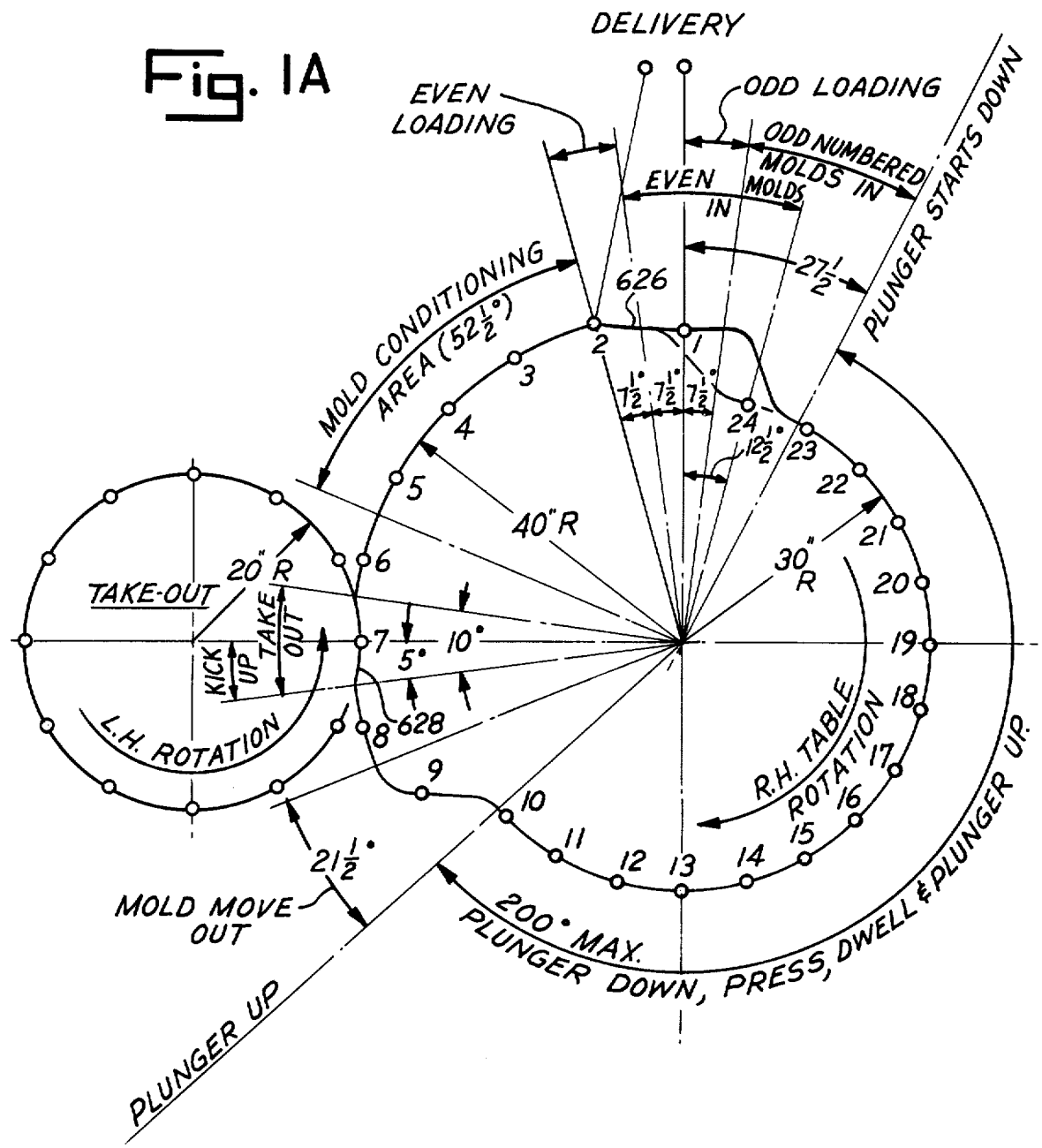
FIG. 1A is a plan, schematic view illustrating the overall operation of the machine shown in FIG. 1.

Referring to FIGS. 1, 1A and 2, the area between the take-out mechanism 60 and the delivery mechanism 58 may be used as the mold conditioning area. As illustrated in the cycle chart, FIG. 1A, the mold conditioning area extends for approximately 52-½° of the 360° required for a complete cycle of operation. In the mold conditioning area, the ram heads 334 are in the raised position, and are positioned inwardly of the molds 64. As best shown in FIG. 1A, the molds 64, in the mold conditioning area, are moved in an arc having a 40 inch radius extending from the center line of the machine 50. The ram heads 334 are moving in a fixed circular arcuate path of travel having a 30 inch radius. This is important because the rams 66 must be spaced away from the molds 64 so that glass gobs may be delivered into the molds 64 by the delivery mechanism 68. In the mold conditioning area, the user of the machine may elect to condition the mold, as with a mold release.

As shown in FIG. 2, cullet or waste glass passes from the machine 50 by passing down through the cullet slots in the moving table 54, into the groove 196 in the fixed base 70 from where the cullet is carried to the cullet chute 198, the moving cullet paddle 197 being fixed to the moving lower table 56. The cullet is moved along ahead of the paddle (or paddles) 197 in the channel 196 where it is discharged to the downwardly inclined channel 198 in the mold conditioning area between the delivery mechanism 58 and the take-out mechanism 60.

It is to be understood that throughout the operation, the molds are moved along the desired provided herein, the molds are moved along the desired path of travel illustrated in FIG. 1A, by cooperation between the inner and outer cams 204 and 206 defining the cam track 208, by the high cam 282, by the crank assemblies 264 including the cam followers 278 and 280 and the roller 274 by the mold slide supports 224 and by the mold slides 232. More specifically, as the lower table 54 is continuously rotated about the vertical axis of the machine, at a preselected rotational speed, as 3-11 rpm, the molds 64 are radially movable relative to the central axis of the machine 50. Since the mold baskets 242 are carried on the slides 232 which are reciprocal radially relative to the upright axis of the machine 50, the relative radial position of the molds 242 in the closed path of travel shown in FIG. 1A is controlled. The upper roller 274 on each of the crank assemblies 264 is received within the groove 240 provided in the underside of the support block 238 mounted on the outer underside of each of the slides 232. The lower cam follower 278 is received within the continuous cam track 208 which is defined by the fixed cams 204 and 206.

Referring to FIG. 11, in the delivery area, the lower cam follower 278 pivots the crank assemblies 262 and 264 for moving the mold 242 to the reverse arcuate path of travel 626, schematically shown in FIG. 1A. In a double gob operation, the upper or high cam follower 280 on the crank assembly 264 only is constructed and arranged to engage the high cam 282 which is positioned just above the outer cam 206 and in the delivery area. Since the crank assemblies 262 and 264 alternate with each other, every other mold 242 is moved differently in the delivery area to accomplish the simultaneous dropping of two glass gobs into pairs of mold 242.

Referring to FIG. 1A, following the mold conditioning area in a double gob operation, "even numbered" molds 242, shown in FIG. 1A, are moved in the reverse arc 626 and the loading or the dropping of the gob occurs within such 7-½° of movement. In practice, the first 1-¼° of the 7-½° arc as shown in FIG. 1A is used for acceleration of the delivery end of the deflector 484 to the same speed as the mold 242 moving therebelow. The last 1-¼° of rotational movement of the deflector 484 is used for deceleration of the deflector 484 for reciprocation back to the starting position. Thus, preferably the dropping of the glass gob takes place in the middle 5° of the 7-½° arc of rotation of the deflector 484 which coincides with the reverse arc 626 in the path of travel of the mold baskets 242.

Referring to FIG. 19, the deflector 484, trough 476 and scoop 466 in both delivery mechanisms are oscillated through the 7-½° arc. The desired oscillation is imparted to the delivery mechanism by the cam followers 460 which engage the cam track 451 in the cam plate 450 at the upper end of each of the rotating shafts 440 which are continuously driven by the gears 432, 434, 436, and 438. The upper end of the cam support rod 458, being secured to the arm assembly 454, pivots the entire gob delivery mechanism 438 about the pivot shaft 453.

In a double gob operation, since the glass shearing mechanism (not shown) provides double gobs simultaneously, the gobs must be dropped into the molds 242 simultaneously. Therefore, the odd numbered molds, referred to in FIG. 1A, are accurately positioned below one of the deflectors 484 by the high cam 280 striking the fixed cam 282. In practice, the odd numbered molds are loaded simultaneously with the even numbered molds but are loaded 15° further in the closed path of travel, as schematically shown in FIG. 1A.

The even numbered molds are loaded in the 7-½° of the first deflector movement and coincident mold basket movement and the odd numbered molds are loaded 15° therebeyond. The even numbered molds are moved inwardly in the 15° following the loading thereof, as shown, and the odd numbered molds are also moved inwardly in the 15° following loading thereof. Both molds are moved inwardly from the 40 inch radial arc to the 30 inch radial arc. When both molds have reached the full "in" position, that is, into the 30 inch radial arcuate path of travel, the ram heads 334, as seen in FIGS. 22 and 23, are moved downwardly into the molds 242 to cause the glass gob therein to form between the mold 242 and ram head 334.

Referring to FIGS. 22 and 23, the upper table 56 is rotated at the same speed as the lower table 54 and the rams 334 are positioned at the same 30 inch circular path of travel as the molds 242 during the pressing cycle. As seen in FIG. 1A, the ram head 334 start down into the molds 242 after both even numbered and odd numbered molds are in the full "in" position. The rams 334 and molds 242 remain in the press position in the approximate 200° following the time the ram head 334 moves downwardly into the mold 242. The slides 232 and molds 242 remain in the 30 inch radius, circular path of travel; the cams used for reciprocating the slides 232 for delivery and take-out do not cause any radial movement of the slides 232 and the molds 242 in the 200° of press time.

As seen best in FIG. 2, the cooling wind is applied through the wind openings only during the time when the ram heads 334 are in the full down position within the molds 242 during the press operation. As seen best in FIG. 7, the cooling wind passes upwardly through the base 70, through the lower table 54, the slide support 224 and slide 232 to the molds 242 for cooling the exterior thereof. As shown in FIG. 23A, cooling wind is also passed to the interior of the head 334 through the air passage 342 in the press rod 336.

After the molds 242 reach the full in position following dropping the gobs, an electrical signal causes the ram heads 334 to start downwardly. More specifically, suitable electrical controls interconnected to the control box 300 cause hydraulic pressure to enter the press cylinder 314 to start the ram 334 downwardly. At the same time, air pressure in the chamber 310 forces the hollow plunger 324 downwardly together with the guide ring 332 to close off the space between the mold 242 and the ram 334. The lower and upper tables 54 and 56 continue in their rotary path of travel, as seen in FIG. 1A, until the cam path 208 changes so as to simultaneously move the molds 242 outwardly from the 30 inch radial arcuate path of travel to the 40 inch radial arcuate path of travel. As shown in FIG. 1A, the molds are moved outwardly in approximately the 21° of table rotation following the raising of the ram heads 334 from the molds 242. The ram heads 334 and guide rings 332 are raised by the cylinder 314 by reversing the hydraulic pressure therein. The air pressure on this plunger 324 is cut off and the plunger 324 is raised when the new guide support 348 contacts it.

By sliding the molds 242 and the formed glass products or ware W therein, to the full out position, the ware W is in position for removal or take out. Referring to FIGS. 10 and 24–31, the take-out operation will be described.

Referring to FIG. 10, the mold 242 is shown in the 30 inch arc prior to movement to the 40 inch arc. After the slide 232 is moved to the 40 inch radial arc, the kick-up rod 492 has its lower end moved into position just above the inner end of the pivoted kick-up arm 494. Substantially simultaneously, the slides 232 and thereby the molds 242 are moved into a reverse arc 628 by operation of the cam mechanism. Referring to FIGS. 24–26, the cam roller 498 contacts the cam face 510 on the cam plate 508. The roller 498 is pivoted downwardly about the pin 496 so as to lift the rod 492 as well as the plunger 490 to thereby lift the ware W completely out of the mold 242 as seen most clearly in FIG. 28.

Figure 27:
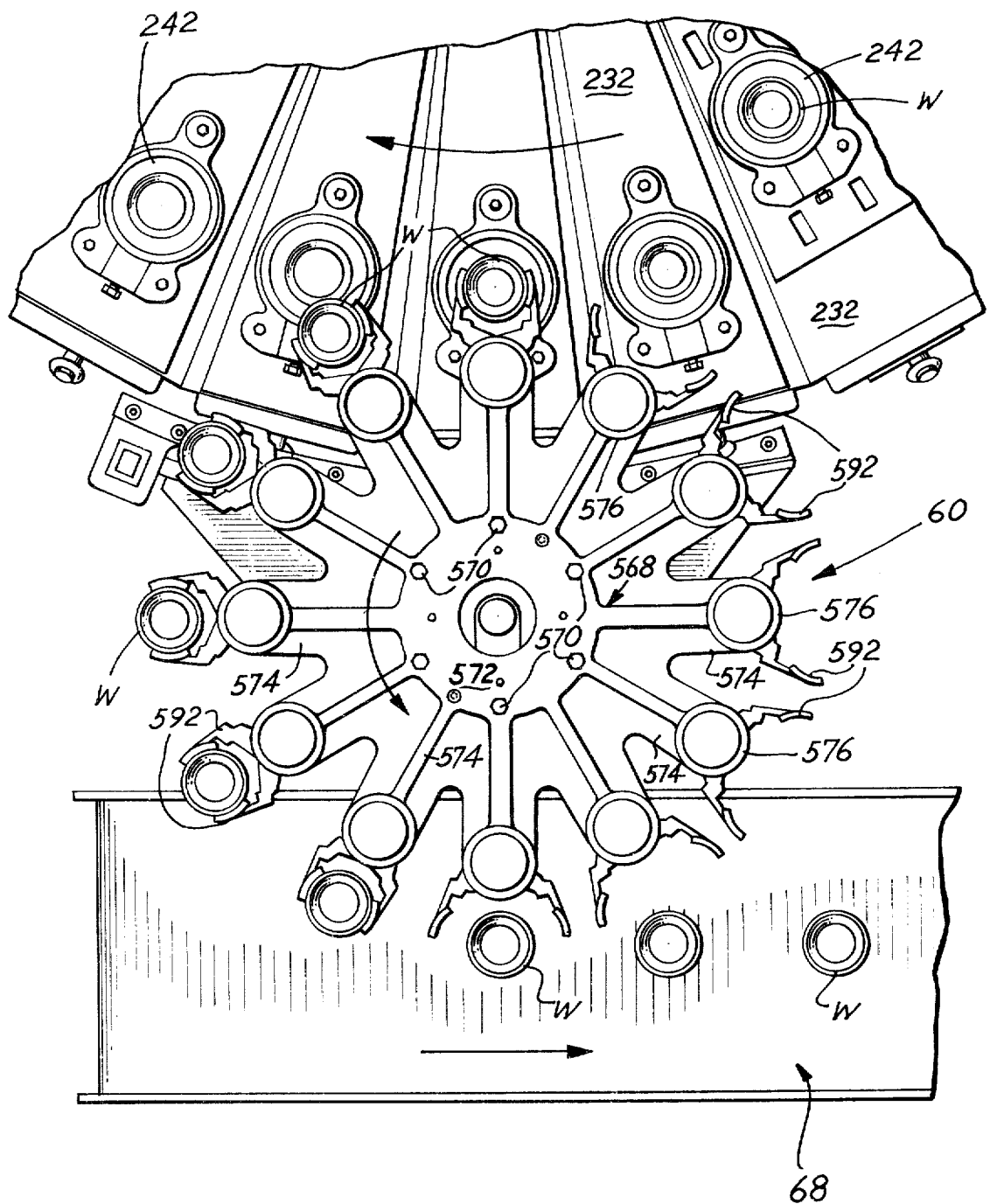
FIG. 27 is a top plan view of the take-out mechanism shown in the embodiment of FIG. 1.

Referring to FIGS. 27 and 28, the jaws 592 are in the open position prior to be moved into the closed position to grasp the ware W, as shown in FIG. 27. In a twenty-four mold operation, only twelve take-out arms are used because the speed of the take-out mechanism 60 is adjusted so that the slides 232 are moved one at a time as opposed to the double movement which occurs at the delivery. The speed of the rotary shaft 546 relative to the speed of the molds is coincident so that the grasping of the ware W is properly sequenced.

Referring to FIGS. 28 and 30, the cam follower 620, at the position shown, causes the arms 592 to be in the open pivoted position. As the shaft 546 rotates the arm assembly 568, the follower 620 moves to the lower portion of the cam 584 to cause the grasping jaws 592 to close into position around the ware W as shown in FIGS. 27 and 31. The jaws 592 remain closed around the ware W until they are once again opened by the cam follower 620 sliding on the cam 584 for depositing the ware W on the belt conveyor 68 for further handling, or packaging.

Simultaneously, with the opening and closing of the jaws 592, the support assembly 604 is moved downwardly to the take-out position by the cam follower 624 riding on the underside of the cam 582. In this way, the ware W may be picked up from the top of the plunger 496 and then deposited on top of the conveyor 68 while, at the same time, the relative height of the bottom of the ware W may be adjusted to the plunger level and to the conveyor level.

Following removal of the ware W from the top of the plunger 490, the assembly 488 drops by gravity. However, in order to assure that the kick-up arm 494 does not remain in the up position and cause the rod 492 to remain in the up position, the cam roller 496 is constructed to engage the cam face 514 on the cam plate 512 to pivot the arm 494 downwardly, thereby substantially assuring that the rod 492 moves to the full down position so that the plug 490 defines the bottom of the mold cavity and permits a glass product of the desired size and shape to be formed.

The drive mechanism 62 shown best in FIGS. 4 and 5 is used for continuously rotating the lower table 54 and the upper table 56 in unison to impart the desired movement to the ram heads 334 and to the molds 242. When the clutch 124 is activated, the gears in the gear box 118 drive the ring gear 164 in a continuous rotary path of travel. Since the ring gear 164 is fixedly secured to the ring gear hub which, in turn, is secured to the outer periphery of the lower table 54, the lower table 54 as well as all parts mounted thereon, including the molds, slides, and slide supports, are also moved in the desired rotary path of travel. Similarly, since the lower table is interconnected to the upper table 56, the ram heads 334 are moved at the same rotary speed as the molds 242 thereby permitting the rams 334 to remain in engagement with the molds 242 to form the ware through approximately 200° of table movement during the press operation. This long forming time combined with the controlled quantity of cooling wind imparted to the molds and to the ram heads causes a particularly well formed glass product to be formed since the product is confined and cooled until there has been a proper set, thereby substantially avoiding product defects, such as wrinkling, commonly encountered with conventional glass molding equipment.

The foregoing description describes a machine 50 which accomplishes all of the objects previously set forth. A continuous motion glass molding machine has been provided which is relatively simple in construction and yet is highly effective in operation. By the movement of the molds 242, into a reverse arc, not only at the delivery position but also at the take-up position, both the delivery operation and the take out position are greatly simplified. The entire mechanism is simple and yet the critical dropping of the gob into the mold may be adjusted over a relatively wide range as a result of the simultaneous movement of both the deflector and mold in the same arcuate path of travel.

The machine 50 contrasts to the prior art continuous glass molding machine wherein only one or two brief times were possible for dropping the gob into a mold. In addition to the unique movement of the molds into reverse arcs, the machine 50 provides cooling wind, which together with the maintenance of the rams 334 in the molds 242 for more than 180° of cycle operation, provide a particularly well formed product because a massive and yet controlled amount of wind may be directly imparted to the exterior of the molds as well as to the ram heads thereby cooling the ware to a hardened condition while being confined.

While in the foregoing, there has been provided a detailed description of a particular embodiment of the prsent invention, it is to be understood that all equivalents obvious to those having skill in the art are to be included within the scope of the invention, as claimed.

What I claim and desire to secure by letters Patent is:

1. In a continuous motion glass molding machine: upwardly opening mold means; means for delivering a glass gob into said mold means; means for pivoting said delivering means about an upright axis; said delivering means having a delivery end for the gob at a fixed horizontal distance from the upright axis; drive means for pivoting said delivering means with said delivery end through an arcuate path of travel of fixed length within a first horizontal plane; a base; carriage means on said base for carrying said mold means; mold drive means for continuously moving said carriage means and mold means thereon in synchronization with said delivery end of said delivery means; fixed cam means on said base; means interconnecting said cam means and said carriage means for moving said mold means into the fixed length path of said delivery end when aligned below said path of travel of said delivery end; and means to supply a glass gob to said delivery means including said delivery end whereby said mold means is moving in the same arcuate path of travel in the same direction as said delivery end during the same period.

2. The machine of claim 1 including ram means mounted on said base at a level above said mold means spaced from said delivery means, means for moving said ram means into said mold means for molding said glass gob into a glass article of a desired shape, and ram drive means on said base for continuously moving said ram means in unison with said continuously moving mold means as the glass article sets into said desired shape.

3. The machine of claim 2 including means for cooling said mold means and the glass article therein as said ram means and said mold means are being moved in unison.

4. The machine of claim 2 including drive means, and means operatively interconnecting said drive means to said ram drive means, said mold drive means, and said pivoting means.

5. The machine of claim 2 including means for moving said ram means out of engaging relationship with said mold means, means for lifting the glass article out of said mold means, and means for removing and carrying the formed glass article away from the mold means.

6. The machine of claim 5 wherein said means for removing the formed glass article includes means for gripping said glass article, means for opening and closing said gripping means for selectively picking up and releasing the formed glass article, and a conveyor for receiving the formed glass article from the removing means.

7. A continuous motion glass molding machine comprising, in combination, a base, carriage means, upwardly opening mold means mounted on said carriage means, means for delivering a glass gob into said mold means, said delivering means having a delivery end at a level above said upwardly opening mold means for dropping said glass gob downwardly into said mold means, means for continuously pivoting said delivering means about a first upright axis for pivoting said delivery means through a selected angle while moving said delivery end in a fixed arc of an arcuate length spaced from said first upright axis, said first axis being laterally spaced from said delivery end at a fixed radial distance, fixed cam means on said base, means operatively interconnecting said carriage means and said cam means, drive means for continuously moving said mold means and said carriage means in one horizontal direction, in synchronization with said delivery end, cam responsive means for moving said carriage means with said mold means thereon through a substantially circular path of travel about a second upright axis, said path of travel including a fixed arc of an arcuate length of travel for said mold means, the said mold means path of travel having substantially the same arcuate length as and being aligned below said fixed arc of said delivery end, said deliverying means delivering a glass gob into said mold means only when said mold means is moving in the same direction as said fixed arc of travel of said delivery end and during the same time period, and ram means for said mold means, means for moving said ram means from a position over said mold means as a gob is delivered into said mold means to the glass molding position for forming the glass article subsequent to the glass gob delivery from said delivering means.

8. The machine of claim 7 wherein said means for moving said ram means moves in a vertical direction, means are provided for moving the ram means in unison with the mold means while in a glass molding position, and means are provided for moving the carriage means laterally outwardly of the ram means where the ram means is in a position over said mold means and while said mold means are out of the molding position.

9. The machine of claim 8 including means for cooling the mold means and the glass article as the ram means and mold means are being moved in unison.

10. The machine of claim 9 including means for lifting the glass article out of said mold means after the glass article is formed, and after the ram means is moved out of the molding position, and means for removing and carrying the glass article away from the mold means out of the substantially circular path of travel thereof.

11. The machine of claim 10 wherein said removing means include means for gripping the glass article, and means for opening and closing the gripping means to selectively pick up or release the formed glass article, and a conveyor for receiving the glass article from the removing means.

12. The machine of claim 11 wherein the path of travel for said mold means includes another arcuate path of travel upstream of the molding position, said removing means includes rotary means defining an arc, aligned above and of the same arcuate length as said another arcuate path of travel, said rotary means removing the formed glass product from said mold means, as said mold means is moving in said another arcuate path of travel, and as said rotary means is moving in said arc and in the same direction of travel as said mold means.

13. The machine of claim 7 wherein said mold means is in a laterally outward position from said ram means when said glass gob is being delivered to said mold means, means for moving the ram means in unison with the mold means during the forming of the glass article, and means for removing the ram means from the mold means during the glass gob delivering time.

14. The mechanism of claim 7 including a plurality of said mold means, said glass gob delivering means successively delivers the formable glass gobs into each of the mold means, and means for successively removing the formed glass articles from each of the mold means.

15. The mechanism of claim 14 including carriage means for each of said mold means.

16. The machine of claim 7 including means for receiving and thereafter discharging cullet from the machine.

17. The machine of claim 7 including means for cooling the mold means and the glass article formed therein, said cooling means being mounted on said base for directing the cooling medium against the mold means to cool the glass article being formed.

18. The machine of claim 7 including a central upright, fixed column, extending upwardly from said base, a lower table supported on said column for carrying said carriage means, and an upper table supported on said column for guidably supporting said ram means.

19. The machine of claim 7 including a continuously rotating table mounted on said base, said carriage means being supported on said rotating table, cooling wind channels in said base, wind openings in said table and in said carriage means in registry with said channels, and means for controlling the cooling wind passing through said channels and said openings for directing cooling wind to said mold means for cooling the glass article being formed.

20. The machine of claim 7 including a continuously rotating table mounted above and adjacent said base, said cam means being rigidly mounted on said base, said carriage means being radially mounted on said rotating table, said mold means being mounted on said carriage means, crank means rotatably mounted on said rotating table, cam follower means on said crank means for engaging said cam means, and means for interconnecting said crank means to said carriage means for imparting both rotary and radial movement to said mold means.

* * * * *